(12) United States Patent
Tsushima et al.

(10) Patent No.: US 6,731,874 B2
(45) Date of Patent: *May 4, 2004

(54) OPTICAL TRANSMISSION APPARATUS AND OPTICAL SYSTEMS

(75) Inventors: Hideaki Tsushima, Wako (JP); Shigeki Kitajima, Kawasaki (JP); Yasushi Sawada, Yokohama (JP)

(73) Assignee: Hitachi, Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/172,811

(22) Filed: Jun. 14, 2002

(65) Prior Publication Data

US 2002/0176142 A1 Nov. 28, 2002

Related U.S. Application Data

(63) Continuation of application No. 09/025,331, filed on Feb. 18, 1998, now Pat. No. 6,424,445.

(30) Foreign Application Priority Data

Feb. 25, 1997 (JP) ................................ 9-040999

(51) Int. Cl.$^7$ ........................ H04B 10/08; H04J 14/00
(52) U.S. Cl. ........................ 398/45; 398/30; 398/48
(58) Field of Search ................ 359/110, 117, 359/124, 177; 390/45, 48, 49, 30, 50, 79, 177

(56) References Cited

U.S. PATENT DOCUMENTS

| | | | | | |
|---|---|---|---|---|---|
| 5,130,835 | A | * | 7/1992 | Stegmeier | 359/124 |
| 5,457,556 | A | * | 10/1995 | Shiragaki | 359/117 |
| 5,663,820 | A | * | 9/1997 | Shiragaki | 359/128 |
| 5,867,289 | A | * | 2/1999 | Gerstel et al. | 359/110 |
| 5,933,258 | A | * | 8/1999 | Flanagan et al. | 359/110 |
| 6,266,169 | B1 | * | 7/2001 | Tomooka et al. | 359/134 |

* cited by examiner

*Primary Examiner*—Leslie Pascal
*Assistant Examiner*—Dalzid Singh
(74) *Attorney, Agent, or Firm*—Sofer & Haroun, LLP

(57) ABSTRACT

An optical transmission apparatus, an optical repeater using the optical transmission apparatus, and an optical cross-connect equipment for controlling switches depending on supervisory information, comprising: a doped fiber for amplifying an optical signal of wavelength Od; a wavelength multiplexer for outputting a pumping light to the doped fiber; a wavelength multiplexer for multiplexing an amplified optical signal and a supervisory optical signal to as to output it to an optical fiber at downstream side; a pumping and supervisory light source; an optical coupler for distributing the light from the light source at a ratio of N:1 to the wavelength multiplexers; and a driver for controlling the light source by adding the supervisory information and a direct current signal.

20 Claims, 18 Drawing Sheets

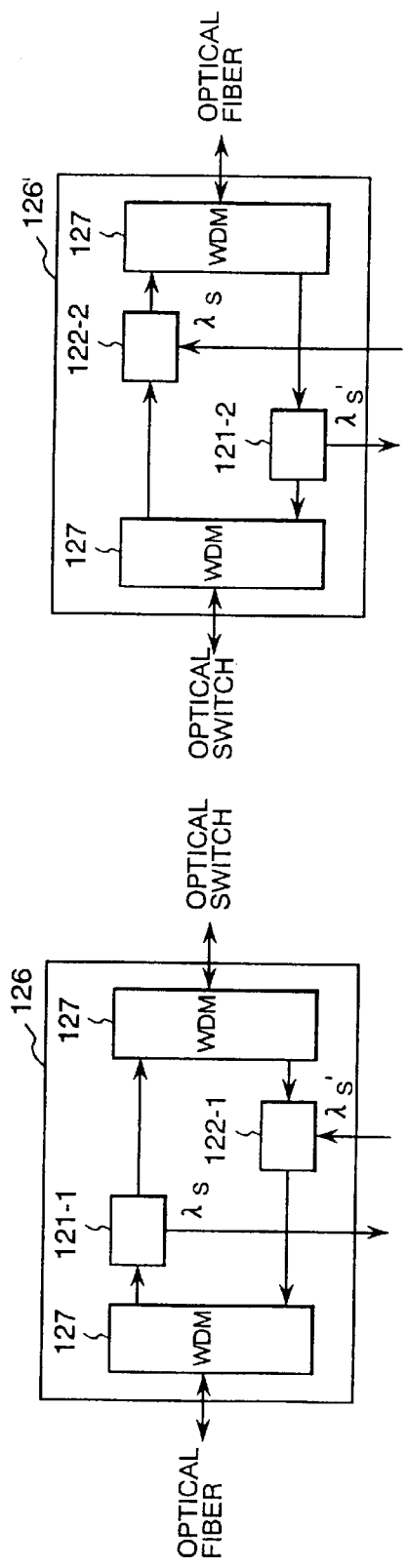
FIG. 20A
FIG. 20B
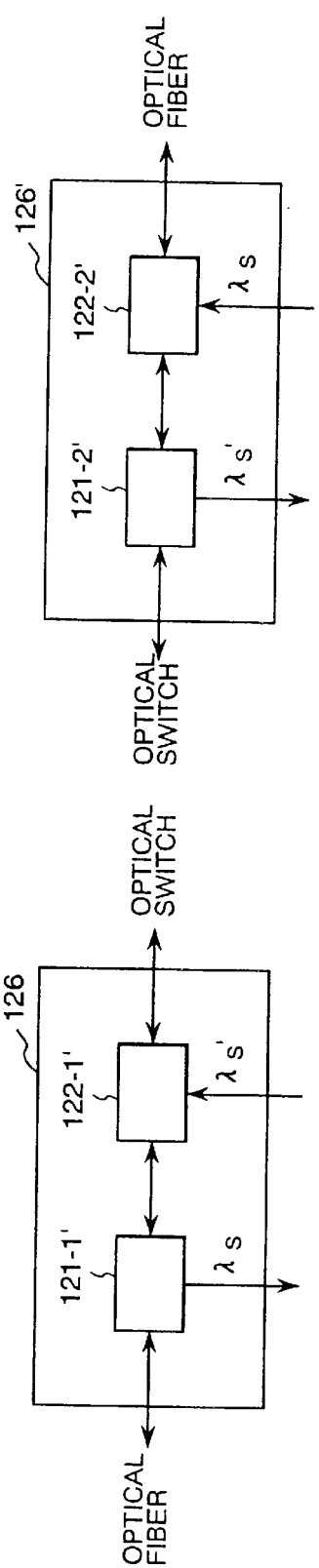
FIG. 20C
FIG. 20D

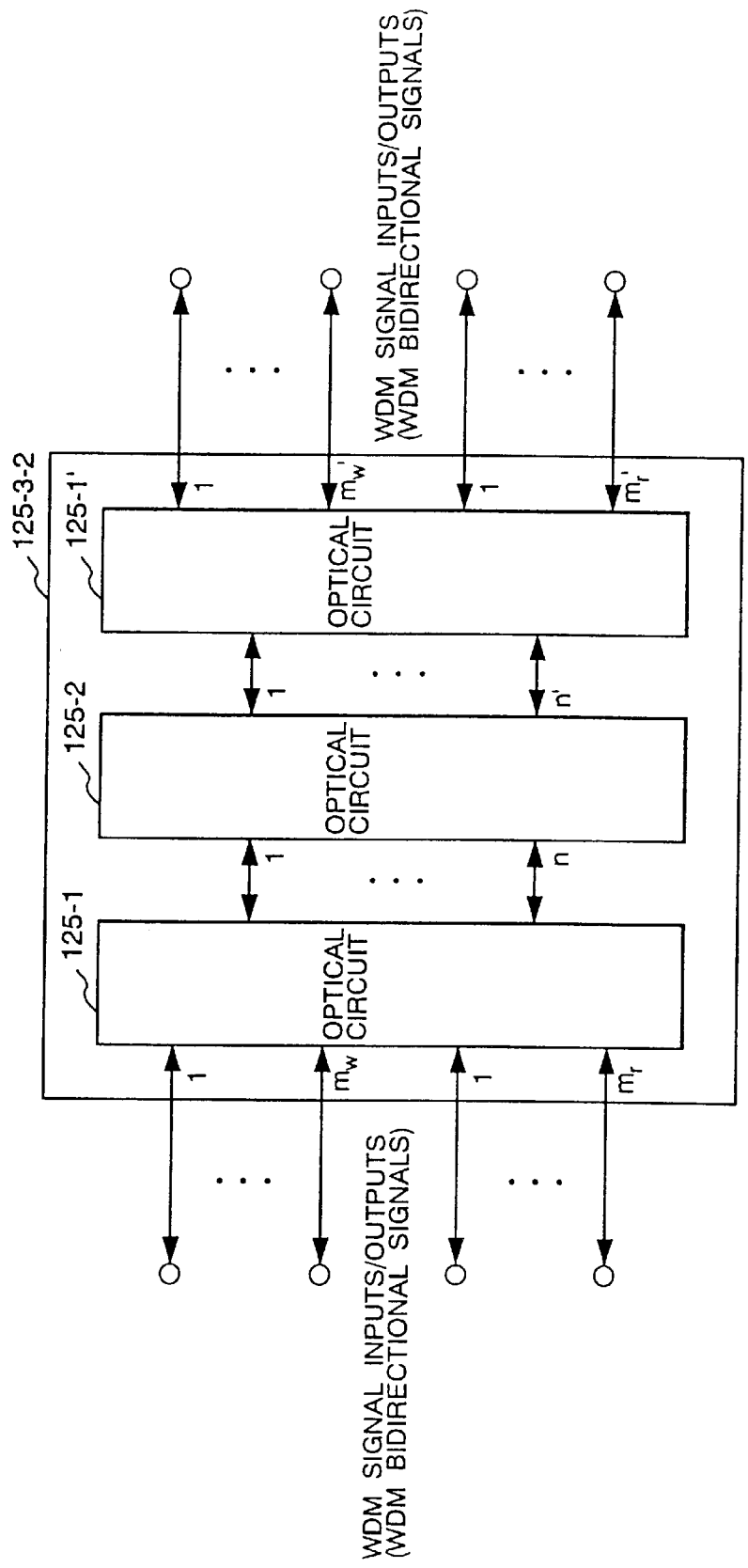

OPTICAL TRANSMISSION APPARATUS AND OPTICAL SYSTEMS

RELATED APPLICATIONS

This application is a continuation and claims priority to U.S. patent application Ser. No. 09/025,331 entitled "OPTICAL TRANSMISSION APPARATUS AND OPTICAL SYSTEM" filed Feb. 18, 1998 U.S. Pat. No. 6,424,445, the entirety of which is incorporated herein by reference.

BACKGROUND OF THE INVENTION

1. Field of the Invention

The present invention relates to an optical transmission apparatus, an optical repeater and an optical cross-connect equipment, and in particular, relates to an optical transmission apparatus, an optical repeater and an optical cross-connect equipment, each having an optical amplifier by means of an optical fiber doped with Erbium, etc., therein.

2. Description of Related Art

In a network constructed by connecting a plurality of node equipment, normally, there is used an optical transmission apparatus in the node equipment thereof, each having an optical amplifier which is formed with optical fiber doped with Erbium, etc. (hereinafter, it is called "doped fiber") and a pumping light source therein. Such the optical transmission apparatus, receiving a data optical signal and a supervisory optical signal, which are different in wavelength thereof to each other and are supplied from an upper stream side, amplifies the data optical signal for outputting it to a downstream side thereof. Alternatively, the optical transmission apparatus, taking it into the node equipment of itself, also has a function of receiving the supervisory optical signal and outputting a new supervisory optical signal to a downstream side thereof, or of outputting the data optical signal, on which data from inside of the node equipment of itself is carried, to the downstream side. The optical transmission apparatus in accordance with the related prior art, for achieving the functions mentioned in the above, is so constructed that it comprises two light sources, i.e., a pumping light source for pumping the doped fiber and a light source for the supervisory optical signal.

The optical transmission apparatus in accordance with the related prior art must have at least two kinds of light sources, therefore, it has drawback that components of the total optical transmission apparatus become very large in the number as well as becoming complex in the construction thereof.

SUMMARY OF THE INVENTION

An object is, in accordance with the present invention, for dissolving the drawbacks in the conventional related arts mentioned in the above, to provide an optical transmission apparatus, an optical repeater, an optical cross-connect equipment, a node equipment, and an optical network, which can be simplified in construction to be cheaply constructed.

In accordance with the present invention, the above-mentioned object is accomplished by an optical transmitting apparatus, comprising: one or more of doped fibers for amplifying an input data optical signal by a pumping light; and an optical wavelength multiplexer for outputting a supervisory optical signal, which is different from the data optical signal in the wavelength thereof, being multiplexed with the data optical signal outputted from the one or more of doped fibers, wherein a common light source is provided, i.e., for the pumping light source, as well as for the optical source of the supervisory optical signal.

Further, the object mentioned above is also achieved by the optical transmission apparatus, which further comprises an optical coupler for distributing the output light emitted from the common light source for the pumping and the supervisory optical signal as mentioned in the above, to the one or more of doped fibers and to the optical wavelength multiplexer, wherein the common light source is so controlled that it outputs a light modulated by a supervisory information, alternatively, which further comprises a modulator for modulating a light depending on the supervisory information, positioned between the optical coupler and the optical wavelength multiplexer, wherein the common light source for the pumping and the supervisory optical signal is so controlled that it outputs a light at a constant output by a direct current signal.

Further, the object mentioned in the above is also achieved by the optical transmission apparatus, which further comprises an optical wavelength multiplexer for dividing the inputted optical signal into the supervisory optical signal and the data optical signal, and a reveiver of the supervisry optical signal.

In accordance with the present invention, the object mentioned in the above is achieved an optical cross-connect equipment having optical switches, each having a plurality of input terminals and output terminals, and a controller for controlling the optical switches, further comprising the above-mentioned optical transmission apparatus being connected to the plurality of input terminals of the optical switches and to the plurality of output terminals thereof, respectively, or alternatively, further comprising a plurality of data signal transmitters and a plurality of data signal receivers, which are connected to the input terminals of the optical switches, thereby controlling the optical switch, the data signal transmitter, the data signal receiver and the plurality of optical transmission apparatuses by the controller, or, by providing the common light source for pumping of the doped fiber and for supervisory optical signal which are necessary for the optical transmission apparatus, in common with the plurality of optical transmission apparatuses.

Further, the above-mentioned object is also achieved by an optical cross-connect switch, comprising: an optical circuit, which includes a plurality of input and output terminals for the optical signals; and a controller for controlling the optical circuit, wherein the optical circuit includes a wavelength multiplexer, a wavelength divider, an optical amplifier, or a regenerator other than the optical switches.

Further, the above-mentioned object is achieved by an optical network constructed by connecting a plurality of node equipment through optical fibers therebetween, wherein each of the plurality of node equipment is constructed with the optical cross-connect equipment mentioned in the above, or alternatively, by providing an optical repeater which includes the above-mentioned optical transmission apparatus on the way of transmission path or line with the optical fibers connecting between those node equipment.

BRIEF DESCRIPTION OF DRAWINGS

FIG. 20 is a drawing for explaining the exemplary structure of a supervisory signal receiving/transmitting apparatus of the optical cross-connect equipment in accordance with the present invention;

FIG. 21 is a drawing for explaining further other exemplary structure of an optical circuit of the optical cross-connect equipment in accordance with the present invention;

DESCRIPTION OF THE PREFERRED EMBODIMENTS

Hereinafter, detailed explanation of the embodiments of an optical transmission apparatus, an optical repeater including the optical transmission apparatus, and an optical network using the optical repeater(s), in accordance with the present invention, will be given by referring to attached drawings.

Figure 1:
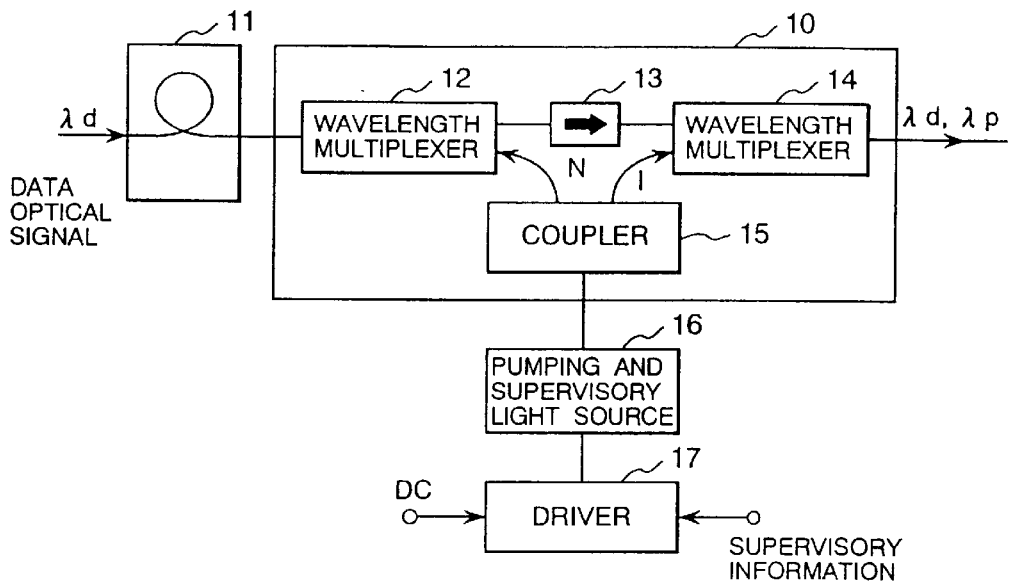
FIG. 1 is a block diagram of showing an exemplary basic structure of an optical transmission apparatus in accordance with the present invention.
Figure 2:
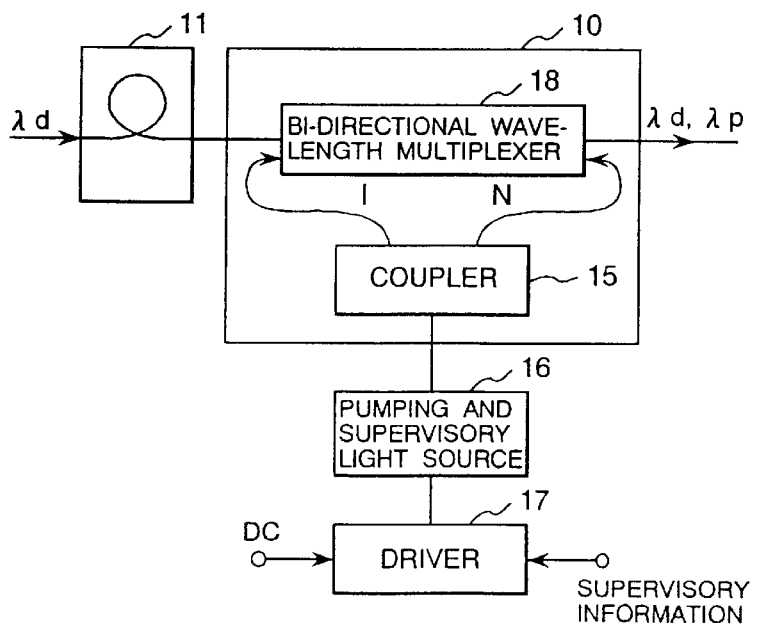
FIG. 2 is a block diagram of showing another exemplary basic structure of an optical transmission apparatus in accordance with the present invention.

FIG. 1 is a block diagram of showing basic structure of the optical transmission apparatus in accordance with an embodiment of the present invention; and FIG. 2 is a block diagram of showing another basic structure of the optical transmission apparatus in accordance with another embodiment of the present invention. In FIGS. 1 and 2, a reference numeral 11 denotes a doped fiber which is doped with Erbium, etc., 12 and 14 wavelength multiplexers, 13 an isolator, 15 an optical coupler, 16 a pumping and supervisory light source, 17 a driver, 18 a bi-directional wavelength multiplexer. In those FIGS. 1 and 2, however, the optical transmission apparatus in accordance with the embodiment of the present invention is shown only by functions of amplification and transmission of a data optical signal and of transmission of a supervisory optical signal, and is able to be used as an apparatus of the transmitter side having data to be transmitted therefrom. A function of receiving the supervisory signal is omitted here to be shown, however, this function can be added as a conventional element or component of the apparatus.

The optical transmission apparatus shown in FIG. 1 is constructed with: the doped fiber 11 which amplifies the data optical signal of wavelength Od which is inputted from the optical fiber of an upper stream side, by inputting a pumping light into the doped fiber; the wavelength multiplexer 12 which inputs the pumping light into the doped fiber 11; the optical isolator 13 which transmits the data optical signal amplified by the wavelength multiplexer 12 into a predetermined direction, i.e., only into a right-hand side direction in the example shown in the figure; the wavelength multiplexer 14 which multiplexes the amplified data optical signal and the supervisory optical signal of wavelength Op and outputs it to an optical fiber at a downstream side; the pumping and supervisory light source 16 which emits a light of wavelength Op for both pumping and supervision purposes; the optical coupler 15 which distributes the pumping and supervisory light from the light source 16 to the wavelength multiplexers at a certain ratio N:1; and the driver 17 in which a supervisory information and a direct current signal are added to each other to control the light source 16. Further, though being positioned between the wavelength multiplexers 12 and 14 in the construction mentioned in the above, the optical isolator 13 can be disposed differently in position thereof, or can be omitted not to be used therein. Furthermore, the wavelength multiplexer 12, the wavelength multiplexer 14 and the optical coupler 15 can be formed in an single body as an optical circuit 10.

A feature of the optical transmission apparatus shown in FIG. 1 in accordance with the present invention lies in that the light for pumping the doped fiber 11 and that for the supervisory information are supplied only by a common light source, i.e., the pumping and supervisory light source 16. Namely, the pumping and supervisory light source 16 outputs a light of wavelength Op which can be used for the purposes of the pumping of the doped fiber and for the supervisory information. This light is divided at the constant ration N:1 predetermined by the optical coupler 15 in power thereof, and the divided portion of "N" of the light is applied through the wavelength multiplexer 12 into the doped fiber 11 for pumping thereof. The remaining "1" portion of the light, as the supervisory optical signal, is inputted into the wavelength multiplexer 14 with the data optical signal which is inputted through the isolator 13, after being amplified, then they are multiplexed to be outputted to the optical fiber at the downstream side. Here, the "N" is a number of the ratio which is determined between the power of pumping light necessary for the doped fiber and that for the supervisory optical signal, and it generally lies from 10 up to several hundreds. Further, as a matter of course, the output light power of the pumping and supervisory light source 16 must be more than the sum of the power necessary for pumping of the doped fiber and that necessary for the supervisory optical signal.

The pumping and supervisory light source 16 is controlled by the driver 17 which receives the direct current signal DC and the supervisory information, therefore, output light thereof results to be modulated by the supervisory information, as well as be controlled by the direct current signal DC in the power thereof. A part of the output light is inputted into the wavelength multiplexer 14, as the supervisory optical signal, as mentioned in the above, together with the data optical signal which is inputted through the isolator 13, after being amplified, and then it is outputted to the optical fiber at the downstream side, after being multiplexed with it. Further, a portion of the modulated optical output is applied to the doped fiber 11 for pumping thereof, however, since a bit rate of the supervisory information is low, the doped fiber 11 is pumped up without influence of the modulation by the pumping light.

In the optical transmission apparatus shown in FIG. 2, in accordance with the embodiment of the present invention, a bi-directional wavelength multiplexer 18 is alternatively provided in place of those wavelength multiplexers 12 and 14 and the optical isolator 13 which are provided in the optical transmission apparatus explained in FIG. 1, and the remaining portions other than the above are constructed in the similar manner. In the optical transmission apparatus of the present embodiment, the bi-directional wavelength multiplexer 18 supplies the output light from the pumping and supervisory light source 16, which is divided by the optical coupler 15, to the doped fiber 11 as the pumping light, while outputting the amplified data optical signal and the supervisory optical signal from the pumping and supervisory light source 16, which is divided by the optical coupler 15, to the optical fiber at the downstream side. Moreover, the bi-directional wavelength multiplexer 18 and the optical coupler 15 can be formed in a single unit or body as the optical circuit 10.

According to the embodiments shown in FIGS. 1 and 2 of the present invention, the single pumping and supervisory light source 16 can be commonly used as the light source for pumping the doped fiber 11 and as the light source for the supervisory information, thereby obtaining the optical transmission apparatus of simple in the construction thereof. Further, though the data optical signal is explained as a signal of single wavelength in the construction shown in FIGS. 1 and 2, however it can be a signal of wavelength multiplexed.

Figure 3:
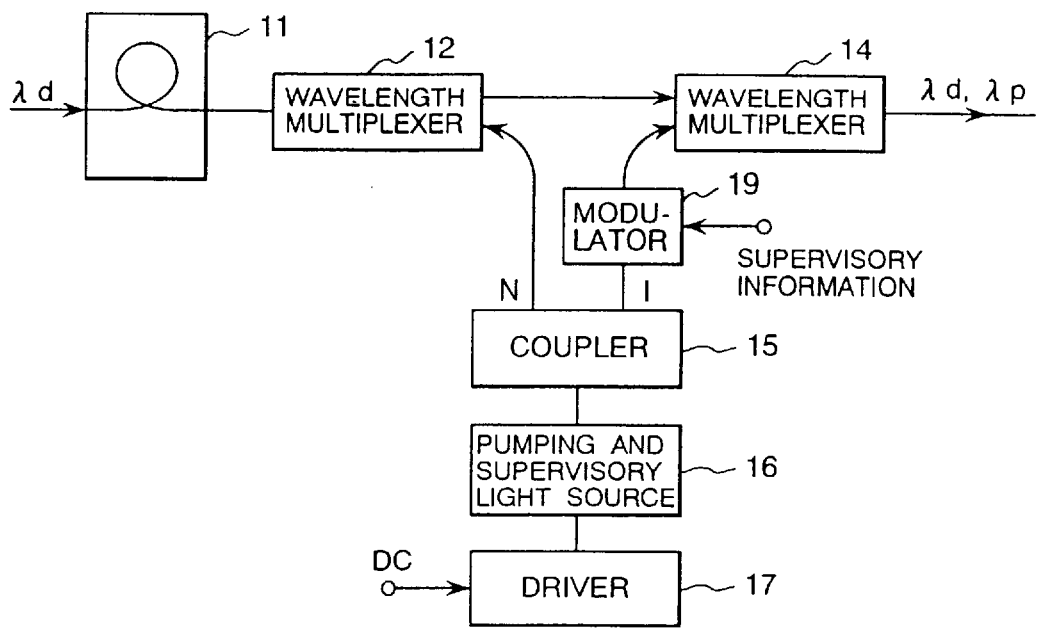
FIG. 3 is a block diagram of showing other exemplary basic structure of an optical transmission apparatus in accordance with the present invention.
Figure 4:
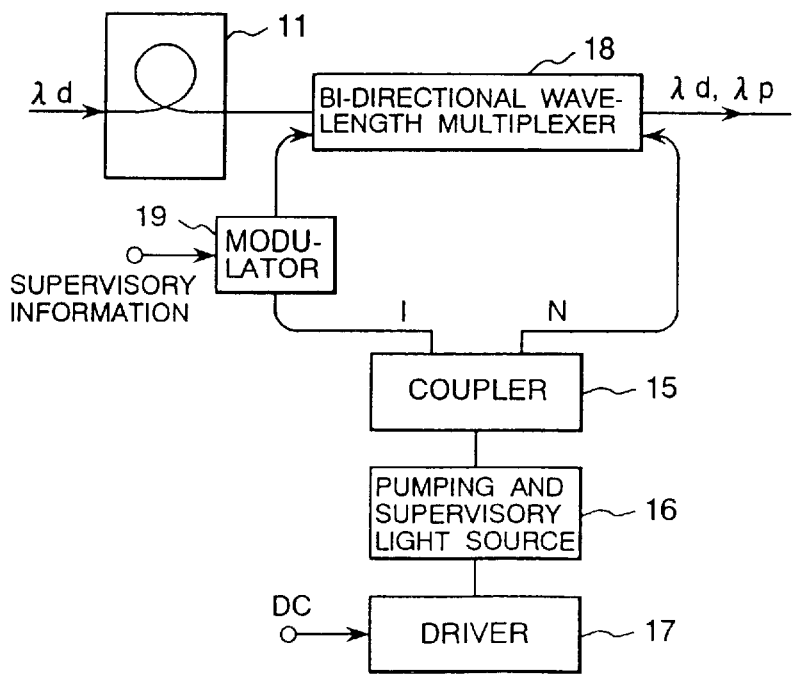
FIG. 4 is a block diagram of showing further other exemplary basic structure of an optical transmission apparatus in accordance with the present invention.

FIG. 3 is the block diagram of showing the basic structure of the optical transmission apparatus in accordance with other embodiment of the present invention, and FIG. 4 is also the block diagram of showing another example of the basic structure of the optical transmission apparatus in accordance with the other embodiment of the present invention. In FIGS. 3 and 4, a reference numeral 19 denotes a modulator, and the other reference numerals denote the same as in FIGS. 1 and 2. Although the supervisory information is inputted into the driver 17 for controlling the pumping and supervisory light source 16 so as to modulate the output light from the pumping and supervisory light source 16 depending on the supervisory information, in the optical transmission apparatus explained in FIGS. 1 and 2, however, in the optical transmission apparatus explained in FIGS. 3 and 4, the modulator for the supervisory information is provided separately, and it operates in the same manner as those shown in FIGS. 1 and 2.

The optical transmission apparatus shown in FIG. 3 in accordance with the embodiment of the present invention is basically same to that shown in FIG. 1, however, it differs from that shown in FIG. 1 only in an aspect that the modulator 19 for modulating the input light depending on the supervisory information is inserted between the wavelength multiplexer 14 for multiplexing the amplified data optical signal (wavelength Od) and the supervisory optical signal so as to output to the optical fiber at the downstream side, and the optical coupler 15 for distributing the output light from the light source 16 at the constant ratio N:1 for the purposes of pumping and for the supervisory information. Consequently, the driver 17 in this embodiment is only enough to control the power of the output light of the pumping and supervisory light source 16 by the direct current DC. However, though the optical isolator is not shown in FIG. 3, it is also possible to provide it in the same manner as shown in FIG. 1.

The optical transmission apparatus shown in FIG. 4 in accordance with the embodiment of the present invention is basically same to that shown in FIG. 2, however, it differs from that shown in FIG. 2 only in an aspect that the modulator 19 for modulating the input light depending on the supervisory information is inserted between the input terminal of the supervisory optical signal on the bi-directional wavelength multiplexer 18 and the optical coupler 15 for distributing the output light from the light source 16 at the constant ratio N:1 for the purposes of pumping and for the supervisory information. Consequently, the driver 17 in this embodiment is also only enough to control the power of the output light of the pumping and supervisory light source 16 by the direct current DC.

With the embodiments shown in FIGS. 3 and 4 in accordance with the present invention, since the pumping and supervisory light source 16, in particular, the output light for pumping thereof is not modulated, it is possible to pump up the doped fiber 11 with pure pumping light, as well as to pump up the doped fiber with certainty even when the bit rate of the supervisory information is risen up. Further, though is explained as a signal of single wavelength in the construction shown in FIGS. 3 and 4, however, the data optical signal can be a signal of wavelength multiplexed.

Figure 5:
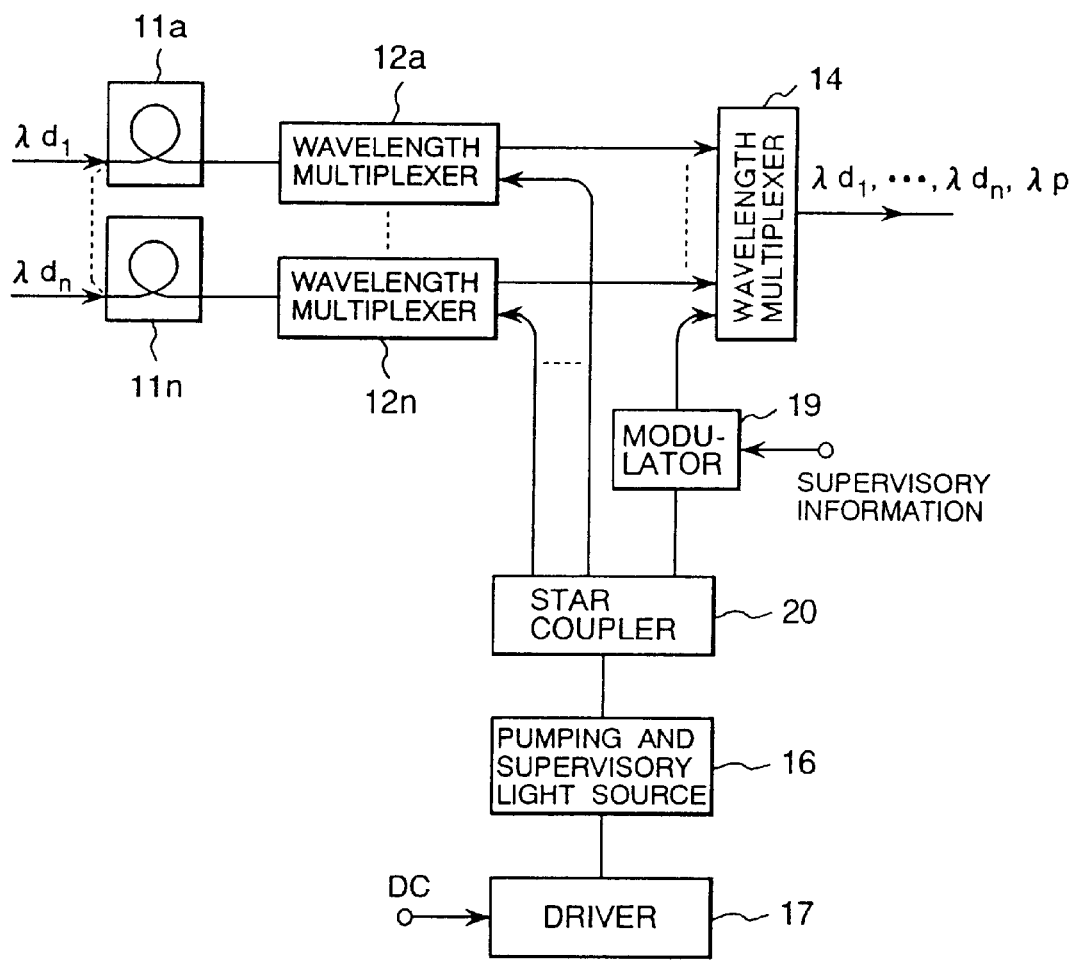
FIG. 5 is a block diagram of showing an exemplary structure of an optical transmission apparatus in accordance with the present invention.

FIG. 5 is the block diagram of showing the basic structure of the optical transmission apparatus in accordance with other embodiment of the present invention. In FIG. 5, reference numerals 11a–11n denote the doped fibers, 12a–12n the wavelength multiplexers, 20 a star coupler, and the others are the same to those in FIG. 3. This embodiment of the present invention is an example obtained by applying the embodiment shown in FIG. 3 to a practical use, and in particular, applying the present invention to the optical transmission apparatus of a wavelength multiplexer type.

The optical transmission apparatus shown in FIG. 5 is constructed with: a plurality of doped fibers 11a–11n for amplifying a plurality of data optical signals of wavelength $Od_1-Od_n$, respectively; wavelength pultiplexers 12a–12n provided corresponding to the respective doped fibers 11a–11n, for supplying the pumping light to those doped fibers 11a–11n and for transmitting the amplified data optical signals; a wavelength pultiplexer 14 for multiplexing the amplified data optical signals and the supervisory optical signal of wavelength Op so as to output it to the fiber at the downstream side; a modulator 19 for modulating the input light depending on the supervisory information so as to send it to the wavelength pultiplexer 14; a star coupler 20 for distributing the output light from the pumping and supervisory light source 16 to those wavelength pultiplexers 12a–12n and the modulator 19; the pumping and supervisory light source 16 for emitting the light of wavelength Op in common for the pumping and the supervising and the driver 17 for controlling the power from the output light of the light source 16 upon application of the direct current signal DC.

However, though the data optical signals are explained as the signals of wavelength $Od_1-Od_n$ in the structure shown in FIG. 5, however, each of those data optical signals of wavelength $Od_1-Od_n$ can be a wavelength multiplexed signal, respectively.

In the above-mentioned embodiments shown in FIGS. 1–5, if the doped fibers 11a–11n are the doped fibers doped with Erbium, a light of wavelength Op of a band 1.48 πm or 0.98 πm is used as the pumping light and the supervisory optical signal, and in this case, as the data optical signals of wavelength $Od_1-Od_2$, is used a light of wavelength band of 1.5 πm.

With the embodiment of the present invention shown in FIG. 5, in addition to the effects obtained with the embodiment shown in FIG. 3, it is possible to pump up the plurality of doped fibers only by provision of the single pumping and supervisory light source 16, and also possible to obtain an effect that the light source can be shared in commonly also for the supervisory purpose.

Figure 6:
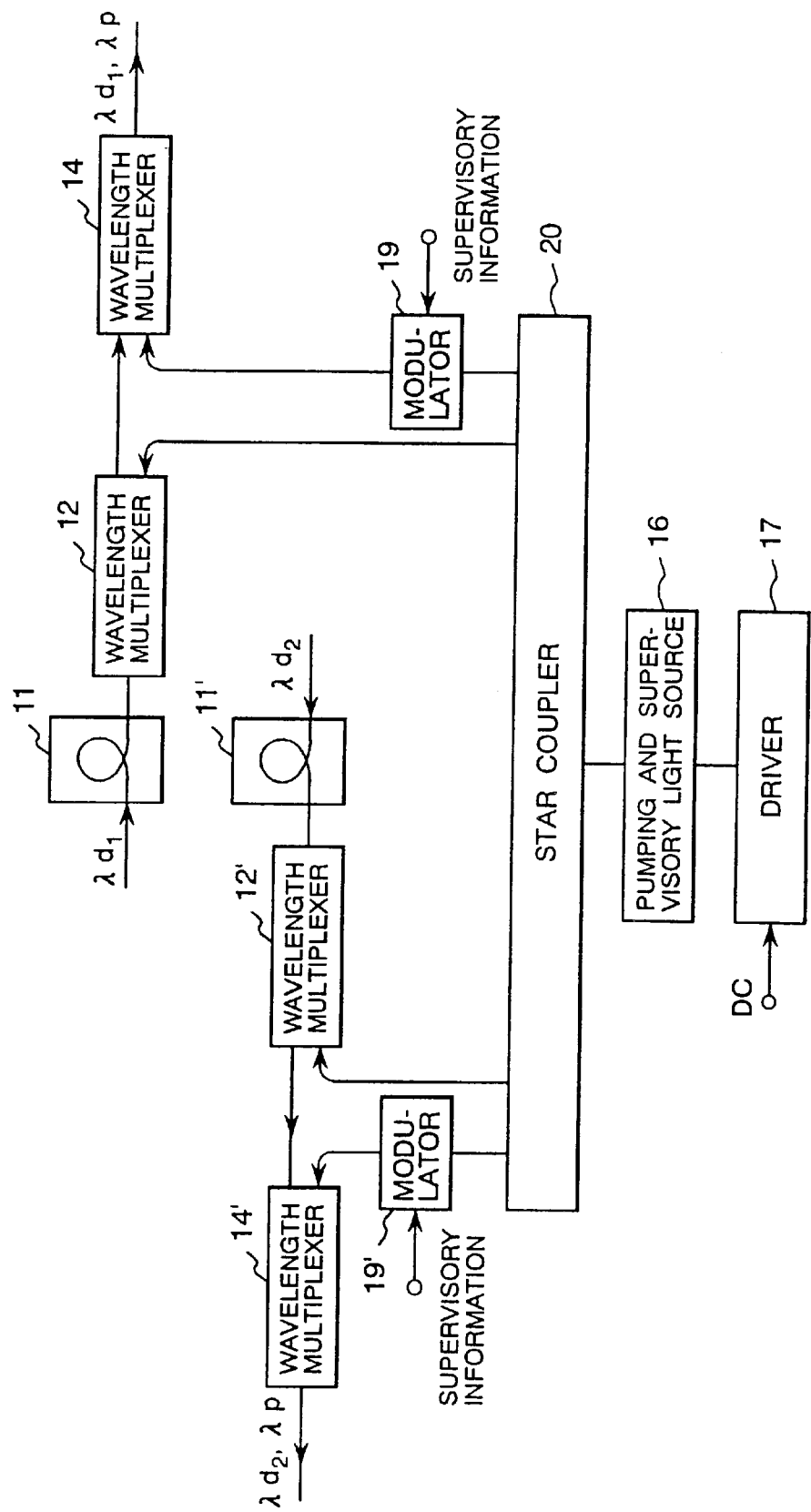
FIG. 6 is a block diagram of showing another exemplary structure of an optical transmission apparatus in accordance with the present invention.

FIG. 6 is the block diagram of showing the other construction of the optical transmission apparatus in accordance with the embodiment of the present invention. In FIG. 6, a reference numeral 11' denotes a doped fiber, 12' and 14' wavelength multiplexers, and the other reference numerals are same to those in the case of FIGS. 3 and 5. This embodiment of the present invention is also a practical application of the embodiment shown in FIG. 3, in particular, being applied to the bi-directional optical transmission apparatus.

In the optical transmission apparatus shown in FIG. 6, wherein the data optical signals of wavelengths $Od_1$ and $Od_2$ are transmitted into directions opposing to each other through the independent optical fibers, in particular, a relay portion for amplifying the data optical signal to relay, which is constructed with the doped fiber 11, the wavelength multiplexers 12 and 14 and the modulator 19 to relay, is completely same to that of FIG. 3. However, it differs from that of FIG. 3, in that there are provided the doped fiber 11', the wavelength multiplexers 12' and 14' and the modulator 19'. The embodiment of the present invention shown in FIG. 6, in common for those, is constructed with a star coupler 20 for distributing the output light from the pumping and supervisory light source 16 to the wavelength multiplexers 12 and 12' and the modulators 19 and 19', the pumping and supervisory light source 16 for emitting a light of wavelength Op for pumping and for supervising signal, and the driver 17 for controlling the power of output light of the light source 16 upon application of the direct current signal DC.

With the embodiment of the present invention shown in FIG. 6, in addition to the effects obtained with the embodiment shown in FIG. 3, it is possible to pump up the two doped fibers for amplifying the data optical signals to be transmitted into the opposite directions, by a provision of only the single pumping and supervisory light source 16, and is further possible to obtain an effect that the light source can be used commonly for the supervisory information.

However, the light waves of $Od_1$ and $Od_2$ can be transmitted into both directions by one piece of optical fiber. In that case, on both sides, i.e. the right-hand side and the left-hand side of the optical transmission apparatus shown in FIG. 6, there must be added devices or elements which can perform combining and/or dividing of the light waves of $Od_1$ and $Od_2$, respectively. Further, though the data optical signal is explained as a signal of a single wavelength in the construction shown in FIG. 6, however, it also can be a signal of wavelength multiplexed.

Further, this embodiment can be applied to the optical transmission apparatus of the wavelength multiplexed type shown in FIG. 5, thereby enabling construction of a bi-directional optical transmission apparatus of wavelength multiplexed type.

Figure 7:
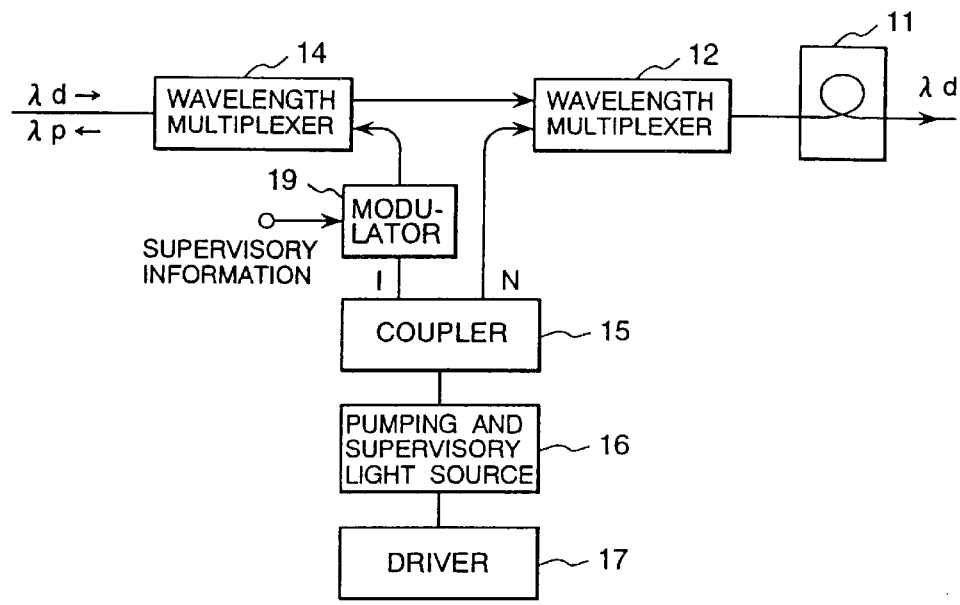
FIG. 7 is a block diagram of showing other exemplary structure of an optical transmission apparatus in accordance with the present invention.

FIG. 7 is the block diagram of showing the other construction of the optical transmission apparatus in accordance with the embodiment of the present invention, wherein the reference numerals are same to those in FIG. 3.

In the respective embodiments of the present invention which are explained heretofore, though the data optical signal and the supervisory optical signal are same in the direction of transmission, however, in the present embodiment of the invention, the transmission direction of the supervisory optical signal is reversed to that of the data optical signal.

The optical transmission apparatus shown in FIG. 7 in accordance with the embodiment of the present invention differs from that shown in FIG. 3, in an aspect that the doped fiber is provided at the output side of the data optical signal and that the modulator 19 for the supervisory infromation is provided between the wavelength multiplexer 14 at the input side and the coupler 15, however, the rests of it are same to those shown in FIG. 3 in the construction thereof. With the optical transmission apparatus of such construction as shown in FIG. 7, the supervisory optical signal which is modulated upon the supervisory information through the modulator 19 can be transmitted into the reversed direction opposing to that of the data optical signal through the wavelength multiplexer 14.

Further, though the data optical signal is explained as a signal of a single wavelength in the construction shown in FIG. 7, however, it also can be a signal of wavelength multiplexed.

Figure 8:
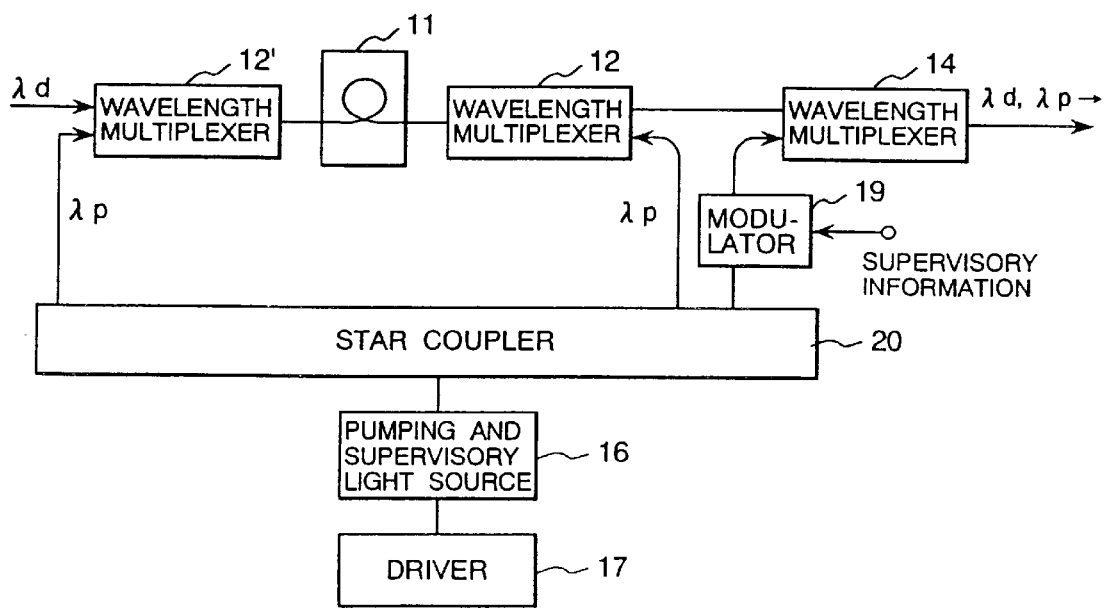
FIG. 8 is a block diagram of showing further other exemplary structure of an optical transmission apparatus in accordance with the present invention.

FIG. 8 is the block diagram of showing the other construction of the optical transmission apparatus in accordance with the embodiment of the present invention, wherein the reference numerals are same to those in FIG. 6. With this embodiment of the present invention, it is possible to pump up the doped fiber from both directions thereof.

In the optical transmission apparatus shown in FIG. 8 in accordance with the present invention, a portion which is constructed with the doped fiber 11, the wavelength multiplexers 12 and 14 and the modulator 19 for amplifying the data optical signal of wavelength Od to relay is completely same to that shown in FIG. 3. However, it differs from that of FIG. 3, in that there is further provided the wavelength multiplexer 12' at a front stage of the doped fiber 11, into which the input data optical signal and the pump optical signal are inputted. The embodiment of the present invention shown in FIG. 8, in common for those, is constructed with: a star coupler 20 for distributing the output light from the pumping and supervisory light source 16 to the wavelength multiplexers 12 and 12' and to the modulator 19; the pumping and supervisory light source 16 for emitting a light of wavelength Op for pumping and supervising; and the driver 17 for controlling the power of output light of the light source 16 upon application of the direct current signal DC.

With this construction, the doped fiber 11 is pumped up in both directions by the wavelength multiplexers 12 and 12', therefore it is possible to obtain a large optical amplification factor therewith. Further, in this construction, a series connection of two pieces of the doped fibers 11 can be provided at positions shown in the drawing, therefore it is possible to obtain a further large optical amplification factor therewith.

With the embodiment of the present invention shown in FIG. 8, it is possible to amplify the data optical signal with the large amplification factor by the provision of only one of the pumping and supervisory light source 16, and is further possible to obtain an effect that the light source can be shared in common also for the purpose of supervision.

Further, though the data optical signal is explained as a signal of a single wavelength in the construction shown in FIG. 8, however, it also can be a signal of wavelength multiplexed.

The respective embodiments of the present invention explained heretofore are explained as the optical transmission apparatus having only a function of amplification and transmission of the input data optical signal and the transmission of the supervisory optical signal. Next, an embodiment of an optical repeater will be explained, in which there is further provided a function of taking-in of the supervisory information from the optical transmission apparatus at the upper stream side thereof, in addition to the above-mentioned optical transmission apparatus in accordance with the respective embodiments of the present invention.

Figure 9:
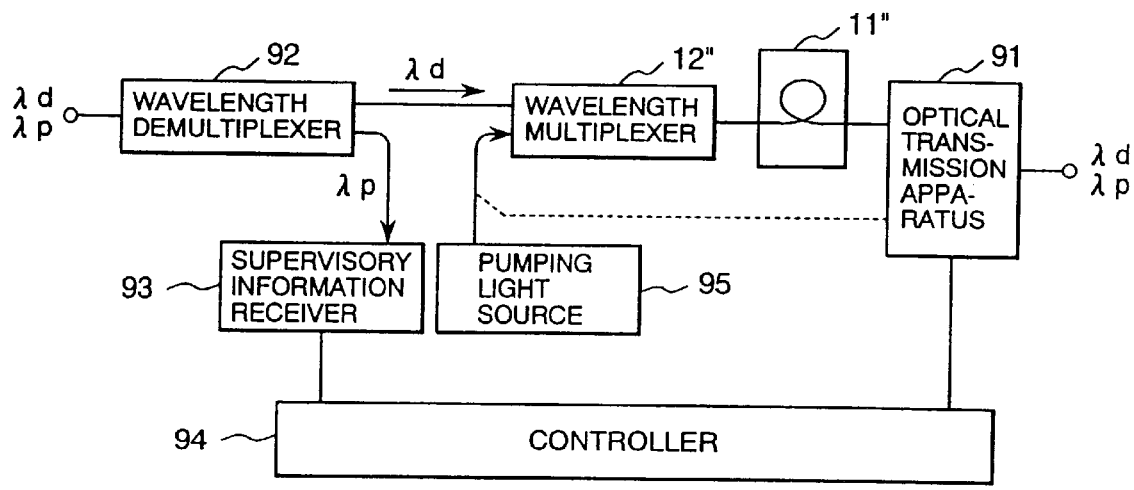
FIG. 9 is a block diagram of showing an exemplary structure of an optical repeater in accordance with the present invention.
Figure 10:
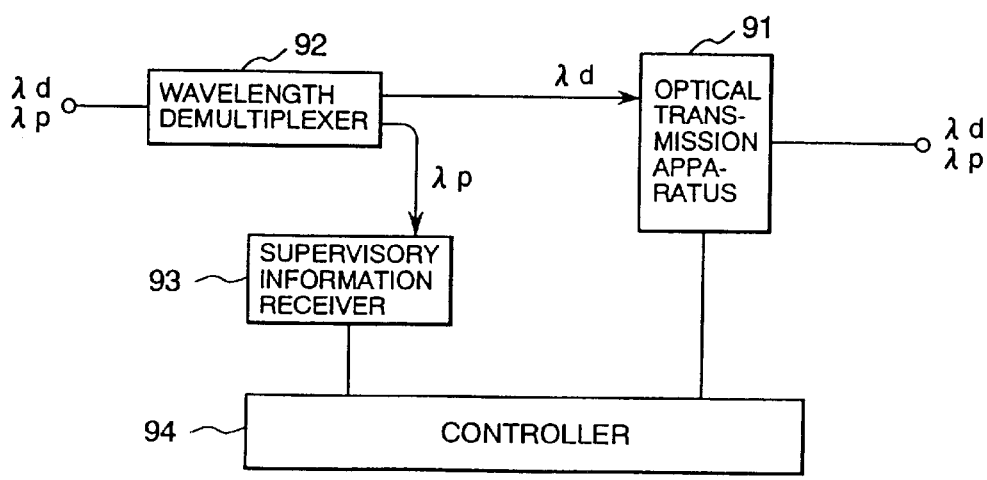
FIG. 10 is a block diagram of showing another exemplary structure of an optical repeater in accordance with the present invention.

FIG. 9 is the block diagram of showing the structure of the optical repeater in accordance with the other embodiment of the present invention. FIG. 10 is the block diagram of showing another structure of the optical repeater in accordance with the embodiment of the present invention. In those FIGS. 9 and 10, a reference numeral 11" denotes the doped fiber, 12" the wavelength multiplexer, and further a reference numeral 91 denotes the optical transmission apparatus which is explained as the embodiments heretofore, 92 a wavelength de-multiplexer, 93 a supervisory information receiver, 94 a controller, and 95 a pumping light source.

The optical repeater shown in FIG. 9, in accordance with the embodiment of the present invention, is constructed by providing: the doped fiber 11"; the wavelength multiplexer 12" for inputting the data optical signal and the pumping light from the pumping light source 95 into the doped fiber; the wavelength de-multiplexer 92 for dividing the data optical signal of wavelength Od and the supervisory optical signal of wavelength Op from the input optical signal; the supervisory information receiver 93 for receiving the supervisory optical signal and converting it into an electric signal so as to deliver it to the controller; and the controller 94 for controlling the totality thereof, at the input side of the optical transmitter apparatus 91 having such the construction of the embodiments of the present invention as explained by referring to FIGS. 1 to 4 and FIG. 8. In the embodiment of the present invention shown in FIG. 9, the optical signals, including the data optical signal and the supervisory optical signal from the other optical repeater which is connected at the front stage thereof but not shown in the drawing, are divided into the data optical signal and the supervisory optical signal through the wavelength de-multiplexer 92. The supervisory optical signal of wavelength Op is converted into the electric signal through the supervisory information receiver so as to be inputted to the controller 94. Further, the data optical signal of wavelength Od, together with the pumping light from the pumping light source emitting the light of wavelength Op, is applied to the doped fiber 11 through the wavelength multiplexer 12 so as to be amplified and inputted into the optical transmission apparatus 91. The controller 94 for controlling the optical repeater as a whole produces an electric supervisory information, on the basis of the supervisory information from the supervisory information receiver 93, so as to be transmitted to a back stage thereof, i.e., to be sent out to the optical transmission apparatus 91. The optical transmission apparatus 91, as is explained previously, produces the supervisory optical signal on the supervisory information from the controller 94, and transmits it into the downstream side together with the data optical signal which is inputted.

Though it is explained that the pumping light source 95 is provided for pumping the doped fiber 11", however, this pumping light source 95 can be used in common with the pumping and supervisory light source which is provided within the optical transmission apparatus 91, therefore, it can be omitted by connecting the wiring as shown by a dotted line in FIG. 9.

In the optical repeater shown in FIG. 10 in accordance with the embodiment of the present invention, the doped fiber 11", the wavelength multiplexer 12" and the pumping light source 95 which are shown in FIG. 9 are deleted, thereby, omitting the amplification function of the data optical signal therefrom. This example is preferably to be applied to when the optical transmission apparatus 91 is constructed with the doped fiber having enough amplification factor, and is able to be constructed with simple construction, in comparison with the doped fiber shown in FIG. 9, but with obtaining the same function thereof. With the embodiments shown in FIGS. 9 and 10, a complete optical repeater having the function of taking-in of the supervisory signal can be simplified in the construction thereof. Further, the data optical signal can be a signal of a single wavelength or wavelength multiplexed signal with which a plurality of wavelength signals are multiplexed.

Further, though it is explained that the optical transmission apparatus having the structure of the embodiment of the present invention shown in either one of FIGS. 1 to 4 and FIG. 8 is used as the optical transmission apparatus 91 in the embodiments of the present invention shown in FIGS. 9 and 10, however, in accordance with the present invention, it is possible to use the other optical transmission apparatus in accordance with the embodiment of the present invention which is also shown in either one of FIGS. 5 to 7, as the optical transmission apparatus 91, thereby, constructing the optical transmission apparatus of the wavelength multiplex type, the optical transmission apparatus of the bi-direction type, and the optical transmission apparatus of a type for transmitting the supervisory optical signal into the direction opposing to that of the data optical signal.

Figure 11:
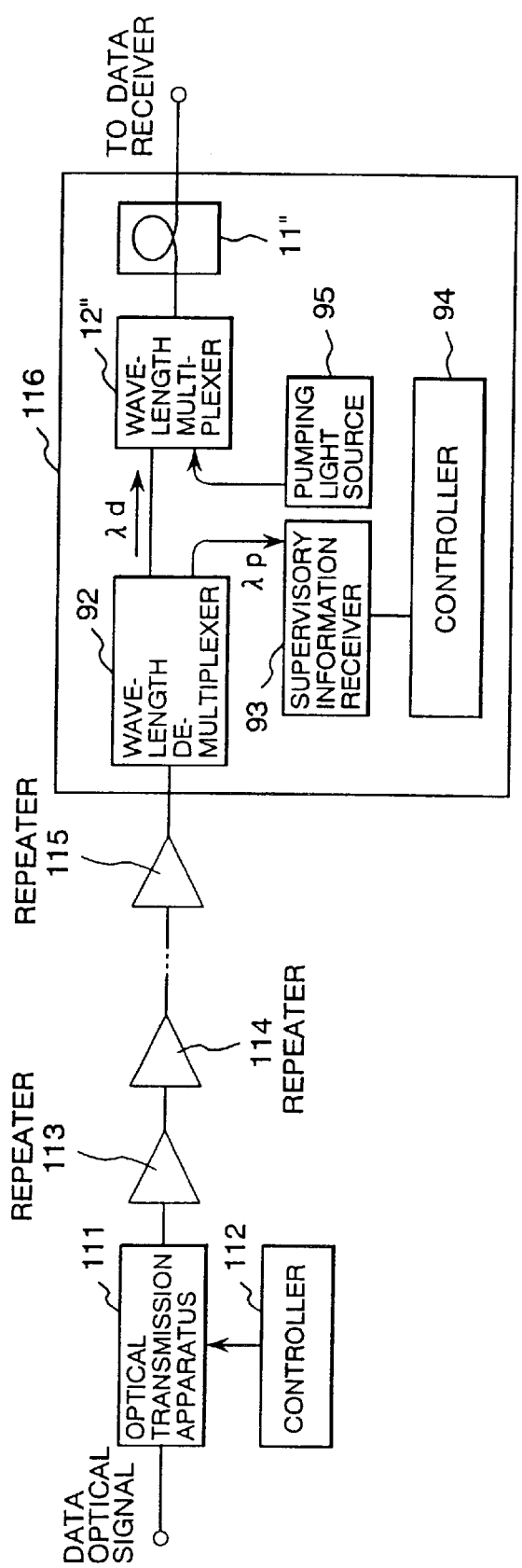
FIG. 11 is a drawing for explaining an example of an optical transmission system which is constructed by use of the optical repeater in accordance with the present invention.

FIG. 11 shows the view of a transmission system which is constructed with the optical repeaters in accordance with the embodiment of the present invention, which is explained heretofore. In FIG. 11, a reference numeral 111 denotes an optical transmission apparatus of transmitter side, 112 a controller, 113–115 optical repeaters, and 116 an optical transmission apparatus of receiver side.

In FIG. 11, the optical transmission apparatus 111 of the transmitter side, which is provided at a transmitter end of the data, is provided with the data optical signal from the data signal transmitter not shown in the drawing, as well as the supervisory information in a form of electric signal from the controller 112. As this optical transmission apparatus 111 of the transmitter side, one of the optical transmission apparatuses in accordance with the embodiments of the present invention, which are explained in FIGS. 1–4 and FIG. 8 can be used. The optical transmission apparatus 111 transmits the optical signal which is obtained by amplifying the inputted data optical signal and the supervisory optical signal modulated on the supervisory information from the controller 112, to the optical transmission apparatus 116 of the receiver side through transmission line of the optical fibers including the optical repeaters 113–115. As the optical repeaters 113–115, one of the optical repeaters of the embodiments of the present invention explained in FIGS. 9 and 10 can be used, and the apparatus 116 of the receiver side is constructed with the optical repeater explained in FIG. 9, but omitting the optical transmission apparatus 91 thereof, wherein the output light of the doped fiber 11" is connected to the data signal receiver not shown in the figure. The apparatus 116 of the receiver side can be constructed with the optical repeater explained in FIG. 10 without the optical transmission apparatus 91 thereof. Further, though is explained as the signal of a single wavelength in the construction shown in FIG. 11, the data optical signal also can be the wavelength multiplexed signal.

Figure 12:
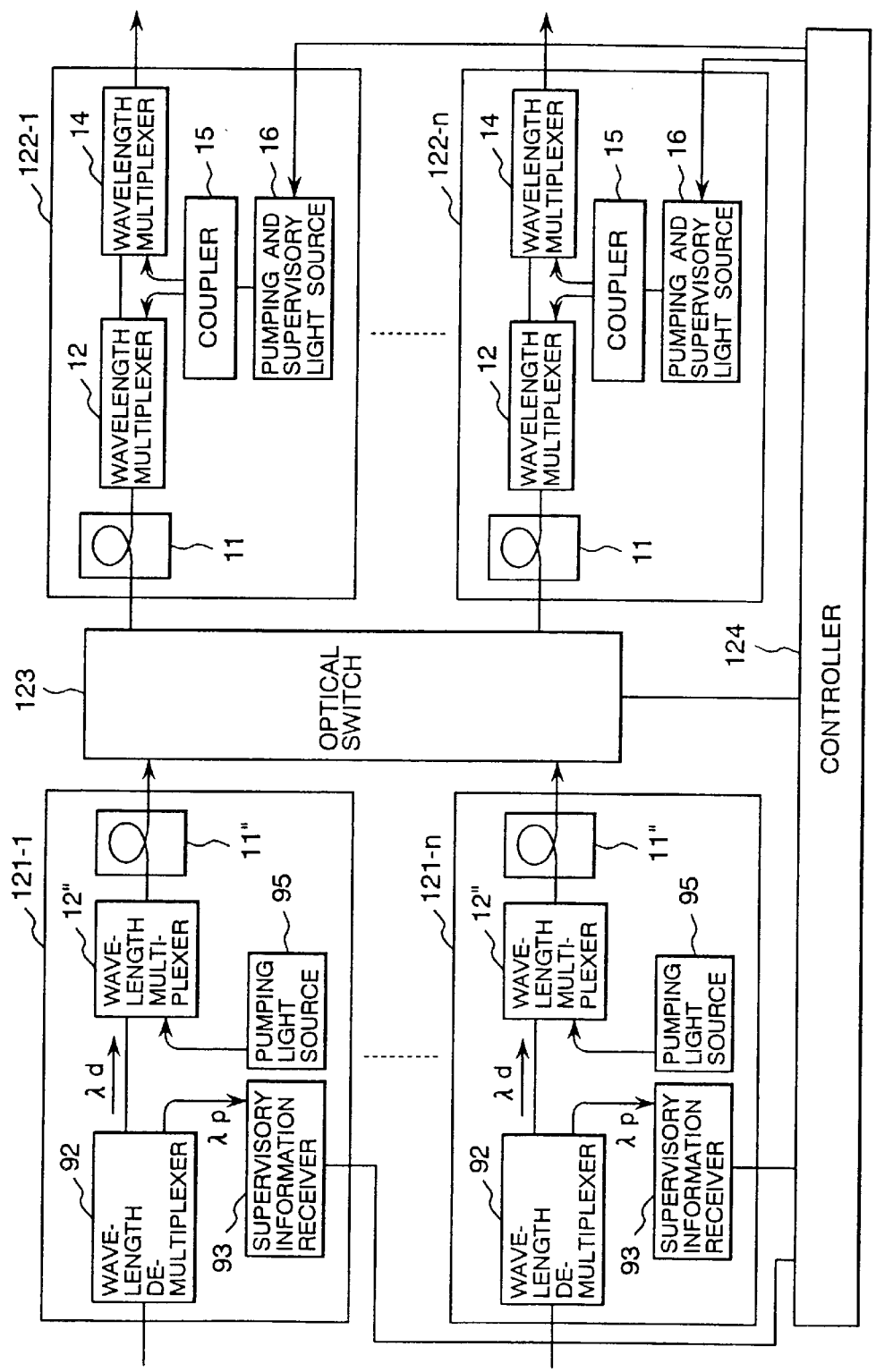
FIG. 12 is a drawing for explaining an example of an optical cross-connect equipment in accordance with the present invention.

FIG. 12 is an explanatory view of an example of the optical cross-connect equipment which is constructed with the optical repeaters of the embodiment of the present invention mentioned heretofore. In this FIG. 12, a reference numeral 121-1-121-*n* and 122-1-122-*n* denote the optical repeaters, 123 an optical switch, and 124 a controller.

The example of the equipment shown in FIG. 12 is the optical cross-connect equipment which builds-in the optical repeaters of the respective embodiments of the present invention mentioned in the above, and this cross-connect equipment is constructed with: the optical switch 123 having a large number of optical switching elements and function of switching the optical signal so that the optical signal can be transmitted from any input terminal to any output terminal; a plurality of optical repeaters 121-1-121-*n* which are connected to those plurality of input terminals; a plurality of optical repeaters 122-1-122-*n* which are connected to those plurality of output terminals; and the controller 124 which controls the totality of those.

The optical switch 123, since it is constructed with the large number of the optical switching elements in an inside thereof, causes an insertion loss of light. Therefore, the plurality of optical repeaters 121-1-121-*n*, which are connected to the input terminal of the optical switch 123, are preferable to have a function of optical amplification, and, in the example shown in FIG. 12, the optical switch 123 is constructed with the optical repeaters explained by FIG. 9, being omitted by the optical transmission apparatus thereof, thereby, the output lights of the doped fibers 11" are connected to the optical switch 123. However, the pumping light sources 95 which are contained in the plurality of optical repeaters 121-1-121-*n* can be replaced by one pumping light source which is provided in common and shared with all of the optical repeaters 121-1-121-*n*. Further, in case that the levels of the data optical signals which are inputted to the optical repeaters 121-1-121-*n* are large, the optical repeaters 121-1-121-*n* have no necessity to have the amplification function. In that case, as the optical repeaters 121-1-121-*n* can be used the optical repeaters, each construction of which is explained in FIG. 10, but omitting the optical transmission apparatus 91 thereof.

As the plurality of optical repeaters 122-1-122-*n* which are connected to the output terminal of the optical switch 123, in the example shown in FIG. 12, are used those, each of which is explained in FIG. 1. As those optical repeaters 122-1-122-*n*, also the optical transmission apparatuses which are explained in FIGS. 2–4 and FIG. 8 can be used.

In the optical cross-connect equipment being so constructed as mentioned in the above, the controller 124 receives the supervisory information, which is divided from the optical signal inputted to each optical repeater and is converted into the electric signal, from respective optical repeaters 122-1-122-*n*, and controls the optical switch 123 on the basis of the supervisory information and other control information, thereby outputting the data optical signals from the optical repeaters 121-1-121-*n* to the optical repeaters 122-1-122-*n* of the output side. Further, after treating the received supervisory information with the necessary processing, the controller 124 distributes the respective supervisory information to the optical repeaters 122-1-122-*n*, thereby controlling the pumping and supervisory light sources 16 which are provided in the respective optical repeaters.

Further, in case that such the optical transmission apparatuses as explained in FIGS. 3, 4 and 8 are used as the optical repeaters 122-1-122-*n*, it is only enough for the controller 124 to control the modulator 19 depending on the supervisory information. In that case, the pumping and supervisory light sources 16 in the optical transmission apparatuses explained in FIGS. 3, 4 and 8 can be replace by a single light source being provided in common for all of the optical repeaters 122-1-122-*n*, and it is also possible to use this single light source in common as the pumping light source for the optical repeaters 121-1-121-*n* as well.

With the optical cross-connect equipment so constructed as mentioned previously, the optical switches and the large number of the optical repeaters can be controlled by the single controller, and, of course depending on the output power of the light source, the single light source can also be used in common as the pumping light source as well as the supervisory light source. In addition thereto, this light source also can be used in common with the large number of the optical repeaters, thereby enabling the construction of the equipment cheap and small in size.

Further, though the data optical signal is explained as a signal of a single wavelength in the construction shown in FIG. 12, however it also can be a signal of wavelength multiplexed.

In case that the data optical signal is the signal of wavelength multiplexed, it is enough to provide a wavelength divider between the optical repeater 121 and the optical switch 123 and to provide a wavelength adder between the optical switch 123 and the optical repeater 122, thereby enabling realization of change-over by an unit of light in the optical switch. In that case, since the number of the optical signals to be changed-over is increased, therefore it is necessary to enlarge the scale of the optical switches 123.

Figure 13:
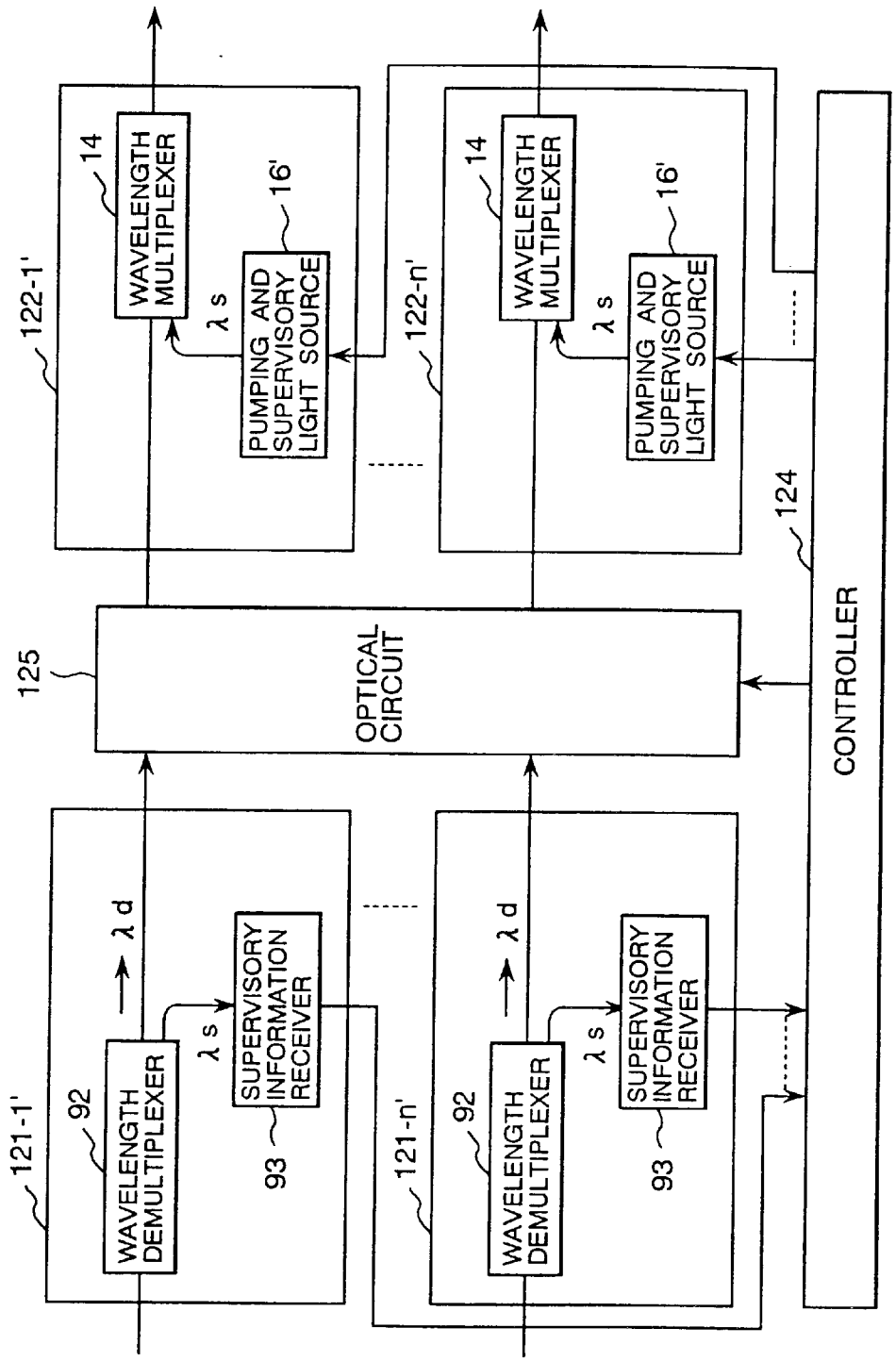
FIG. 13 is a drawing for explaining another example of an optical cross-connect equipment in accordance with the present invention.

Next, other optical cross-connect equipment in accordance with the present invention will be explained by referring to FIGS. 13 through 18. FIG. 13 shows another example of the optical cross-connect equipment constructed with the optical repeaters of the embodiment of the present invention explained heretofore. In FIG. 13, reference numerals 121-1'-121-$n'$ and 122-1'-122-$n'$ denote the optical repeaters, 16' the supervisory light sources, 125 an optical circuit including the optical switches, and the other reference numerals are same to those attached in FIG. 12. Embodiments of the optical circuit are shown in FIGS. 14 through 18.

In the optical cross-connect equipment explained in FIG. 12, if the level of the data optical signal which is inputted/outputted to the optical repeaters 121 is large and if the insertion loss of the optical switch 123 is small, it is not necessary for the optical repeaters 122 to have the function of amplification. The optical cross-connect equipment shown in FIG. 13 is an example of that in which no such amplification function is provided in the optical repeaters. Namely, the optical cross-connect equipment shown in FIG. 13 is constructed with the optical repeaters 121-1'-121-$n'$ and 122-1'-122-$n'$ which have no amplification function, whereas each of the optical repeaters 121-1'-121-$n'$ has a function of dividing and receiving the supervisory optical signal, while each of the optical repeaters 122-1'-122-$n'$ has a function of multiplexing and sending of the supervisory optical signal and the data optical signal. Therefore, the light source 16' included in each of the optical repeaters 122-1'-122-$n'$ is used only as the supervisory light source. Terefore, the wavelength Os of the light source can be selected in 1.3 πm band or in 1.5 πm band (for example, at 1.51 πm) where showing low loss in the transmission line, outside of the band-width of Erbium doped fiber, or within the band-width of the Erbium doped fiber as well. Further, it can be selected at the wavelength 1.48 πm being same to that of the pumping light source.

Within the supervisory optical signal sent from the upper stream, there is included a control signal of the optical circuit 125, therefore, by this control signal, it is possible to control the optical switches, the optical amplifiers, the regenerators, etc., included in the optical circuit. In the same manner, it is also possible to include the control signal for the cross-connect equipment within the supervisory optical signal to be to the downstream side thereof.

Figure 14:
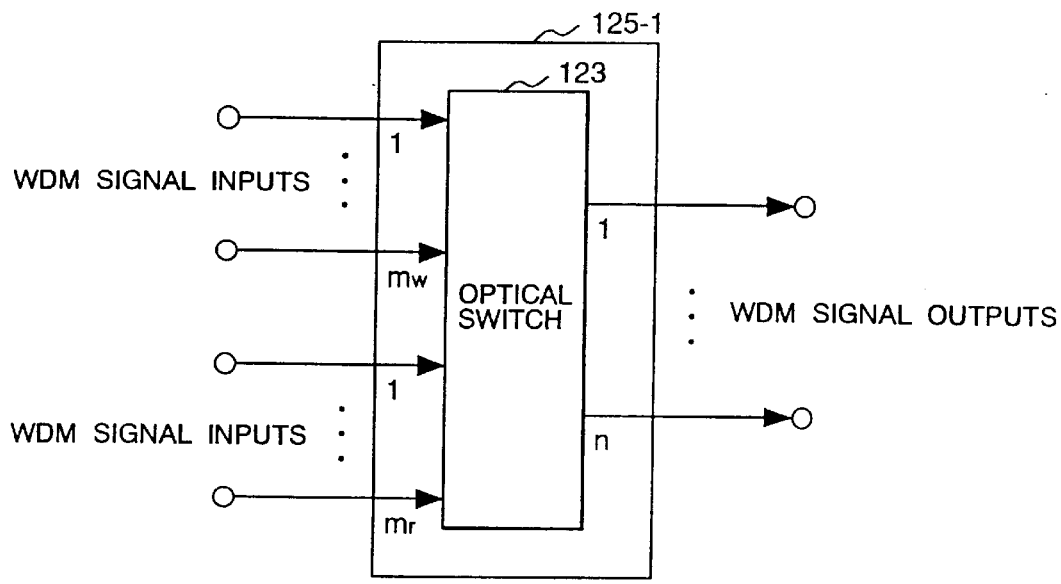
FIG. 14 is a drawing for explaining an exemplary structure of an optical circuit of the optical cross-connect equipment in accordance with the present invention.

Various examples of the optical circuits, which can be applied to the optical cross-connect equipment in FIG. 13, are shown in FIGS. 14 through 18. The optical circuit 125-1 shown in FIG. 14 is an optical matrix switch of $(m_w+m_r)$ υn construction. The optical circuit 125-1 changes over WDM signals all together. For instance, in case that $m_w$ pieces of the working fibers and $m_r$ pieces of protection fibers are connected at the input terminal of the optical circuit 125-1, and when the optical fibers or the optical cables are cut down, the optical circuit 125-1 changes over the transmission lines from the working fibers where any obstruction or trouble occurs to the normal protection fibers, by the control of the controller 124, thereby, enabling the realization of restoration from the obstruction or trouble.

Here, the optical switch used in the optical circuit can be a blocking type or non-blocking type. Further, it does not matter even if the number of the inputs and the number of the outputs of the optical circuit are same to or different to each other. Furthermore, the WDM signal is explained as uni-directional one, in the example mentioned in the above, but it can be a signal of a single or uni-wavelength, or a bi-directional signal.

Figure 15:
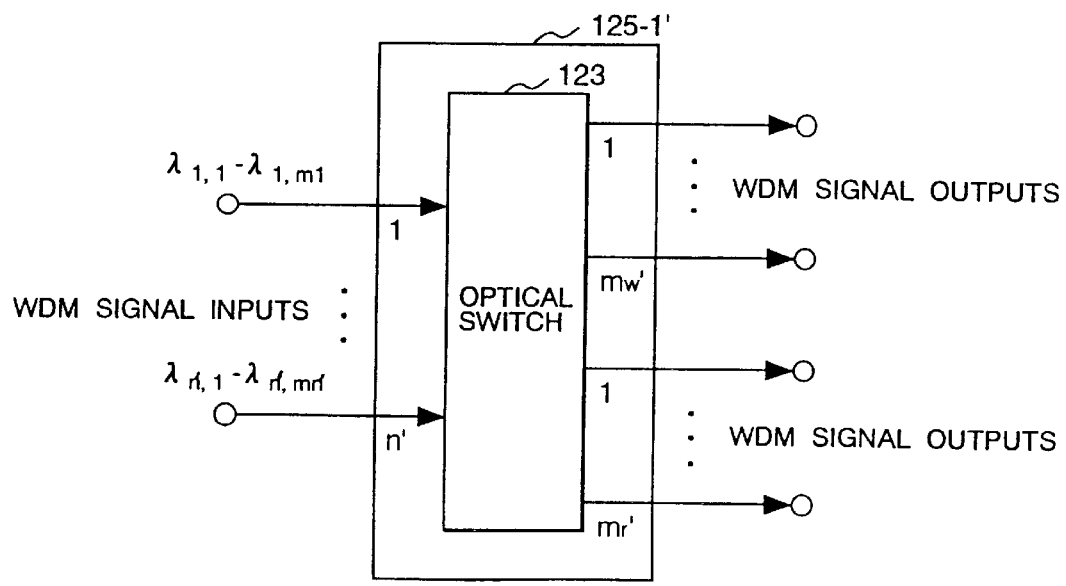
FIG. 15 is a drawing for explainig another exemplary structure of an optical circuit of the optical cross-connect equipment in accordance with the present invention.

The optical circuit 125-1' shown in FIG. 15 is an optical matrix switch of $n'υ(m_w'+m_r')$ construction. The optical circuit 125-1' also changes over the WDM signals all together. For instance, in case that $m_w'$ pieces of the working fibers and $m_r'$ pieces of protection fibers are connected at the output terminal of the optical circuit 125-1', and when the optical fibers or the optical cables are cut down, the optical circuit 125-1 changes over the transmission lines from the working fibers where any obstruction or trouble occurs to the normal protection fibers, by the control of the controller 124, thereby, enabling the realization of restoration from the obstruction or trouble.

Here, the optical switch used in the optical circuit can also be a blocking type or non-blocking type. Further, it does not matter even if the number of the inputs and the number of the outputs of the optical circuit are same to or different to each other. Furthermore, the WDM signal is explained as uni-directional one, in the example mentioned in the above, but it also can be a signal of a single wavelength, or a bi-directional signal.

Figure 16:
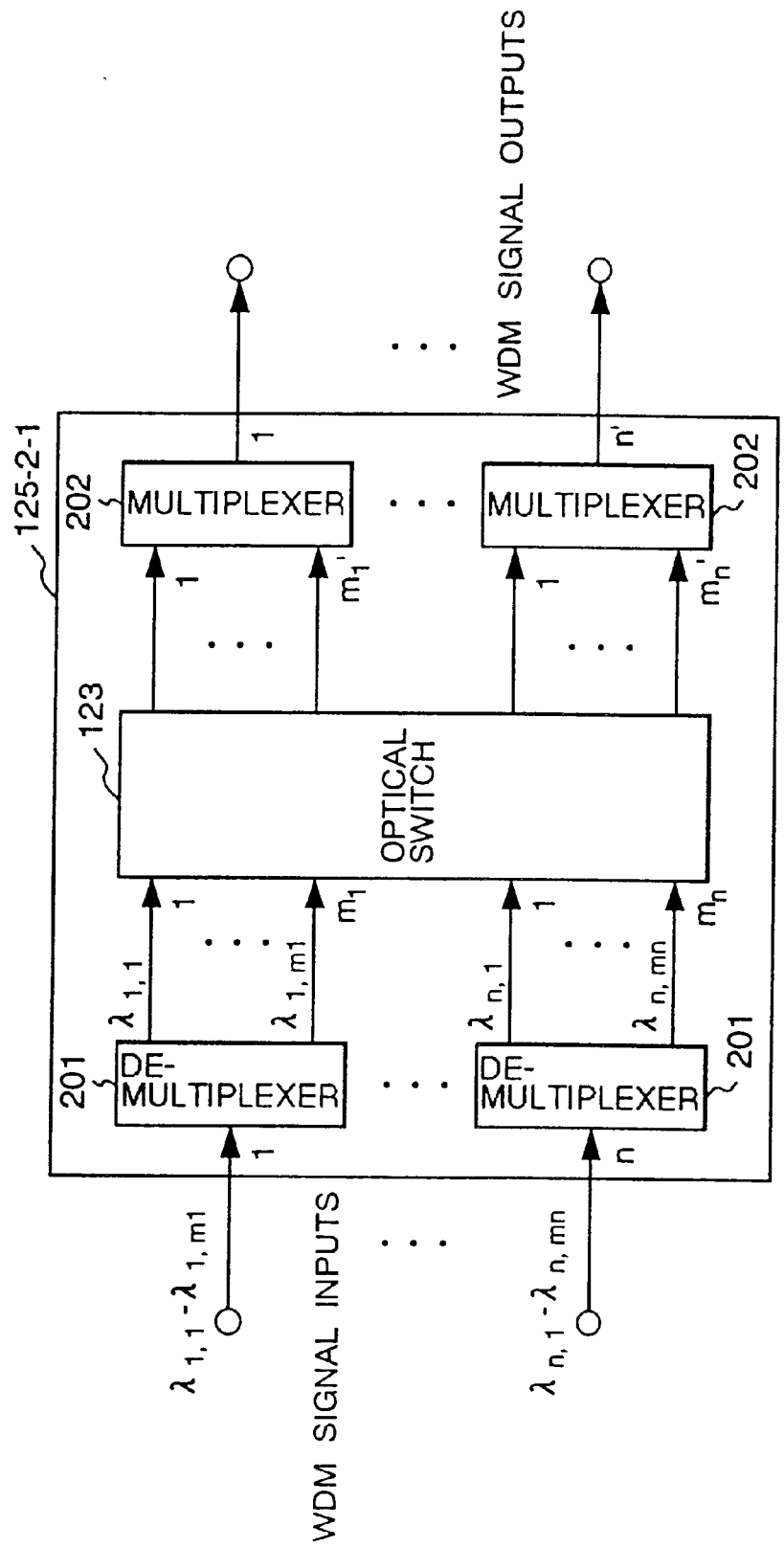
FIG. 16 is a drawing for explaining other exemplary structure of an optical circuit of the optical cross-connect equipment in accordance with the present invention.

The optical circuit 125-2-1 shown in FIG. 16 is constructed with a wavelength demultiplexer 201, an optical matrix switch 123 of $(m_1+\ldots+m_n)υ(m_1'+m_n')$ construction, and a wavelength multiplexer 202. The optical circuit 125-2-1 de-multiplexing the inputted WDM signals in the wavelength thereof performs the change-over for each wavelength, and multiplexes in the wavelength for providing an output. This has a function of setting a transmission line for each wavelength. In FIG. 16, the de-multiplexing in the wavelength is shared by the plurality of wavelength multiplexing circuits 201 and 202, however it can be shared by the wavelength de-multiplexer circuit 201 and the wavelength multiplexer circuit 202. Here, the optical switch 123 is controlled by the controller 124 shown in FIG. 13. The optical switch used in the optical circuit can be a blocking type or non-blocking type. Further, it does not matter even if the number of the inputs and the number of the outputs of the optical circuit are same to or different to each other. Furthermore, the WDM signal is explained as uni-directional one, in the example mentioned in the above, but it can also be the signal of a single wavelength, or the bi-directional signal.

Figure 17:
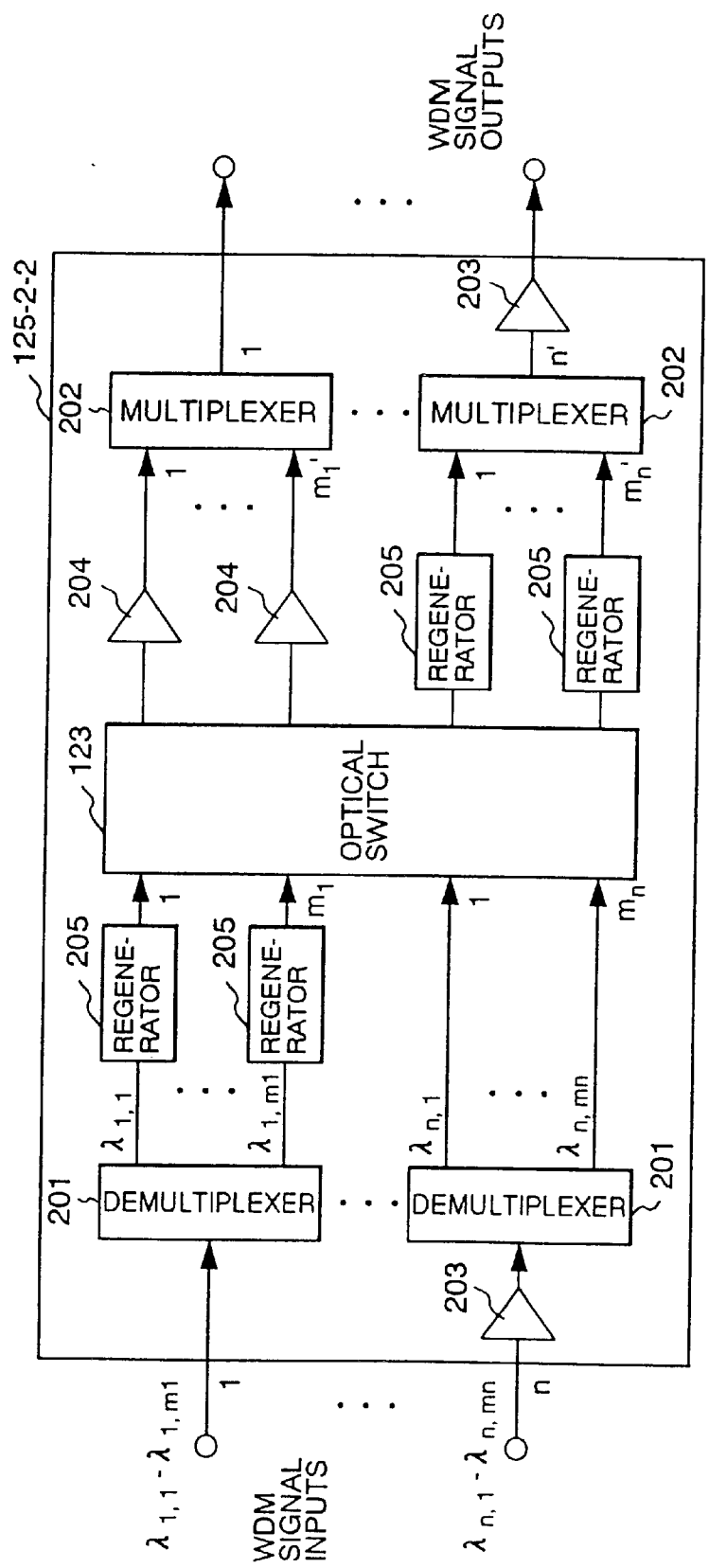
FIG. 17 is a drawing for explaining further other exemplary structure of an optical circuit of the optical cross-connect equipment in accordance with the present invention.

The optical circuit 125-2-2 shown in FIG. 17 is an improved one of the optical circuit 125-2-1 shown in FIG. 16, thereby being applicable to an optical fiber transmission of long distance. Therefore, between the wavelength de-multiplexer 201 and the optical matrix switch 123 of $(m_1+\ldots+m_n)υ(m_1'+m_n')$ construction, or between the optical switch 123 and the wavelength multiplexer 202, there is inserted the regenerator 205 or the optical amplifier 204 for each wavelength. Furthermore, at the front stage of the wavelength de-multiplexer 201 or the back stage of the wavelength multiplexer 202, there is inserted the optical amplifier 203 for each the WDM signal.

The output wavelength of the regenerator 205 can be either of being variable or fixed. Further, it does not matter if it is the same to that of the input wavelength or not. The optical amplifiers 203 and 204 are controlled in the output power thereof, depending on the change in the bit rate of the optical signal. Here, the optical switch 123, the regenerator 205, and the optical amplifiers 203 and 204 are controllable by means of the controller 124 shown in FIG. 13. The optical switch used in the optical circuit can be also of a blocking type or non-blocking type. Further, it does not matter even if the number of the inputs and the number of the outputs of the optical circuit are same to or different to each other. Furthermore, the WDM signal is explained as the uni-directional one in the example mentioned in the above, but it also can be the signal of a single wavelength, or the bi-directional signal.

Figure 18:
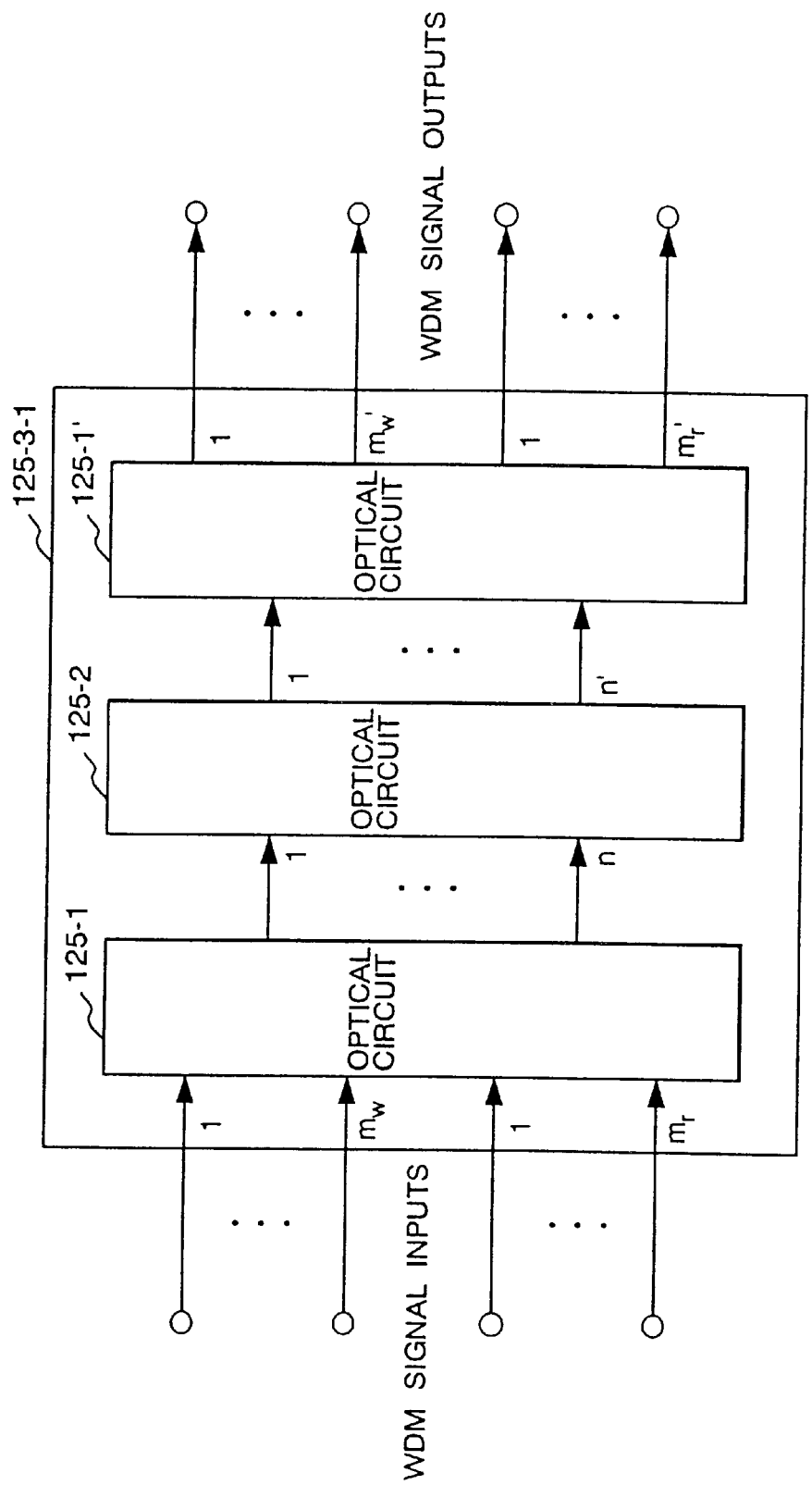
FIG. 18 is a drawing for explaining further other exemplary structure of an optical circuit of the optical cross-connect equipment in accordance with the present invention.

FIG. 18 shows the other embodiment of the optical circuit. The optical circuit 125-3-1 is constructed with combination of the optical circuit 125-1 and the optical circuit 125-2 (-1 or -2), and the optical circuit 125-1'. With this construction, the change-over by an unit of the WDM signal is first performed by the optical circuit 125-1 with respect to the input of the WDM signal, then the change-over by an unit of the individual wavelength is performed by the optical circuit 125-2-1 or 125-2-2. Finally, the change-over by an unit of the WDM signal by the optical circuit 125-1' is performed for sending out thereof.

With the optical circuit 125-3-1, it is possible to realize the functions of the optical circuit 125-1, the optical circuit 125-2 and the optical circuit 125-1', at the same time. Namely, the restoration from the obstruction or trouble, including cut down of the optical fibers or the optical cables, and the setting of transmission lines by an unit of the wavelength can be realized.

The operation of the optical circuit 125-3-1 is controllable by the controller shown in FIG. 13.

Figure 19:
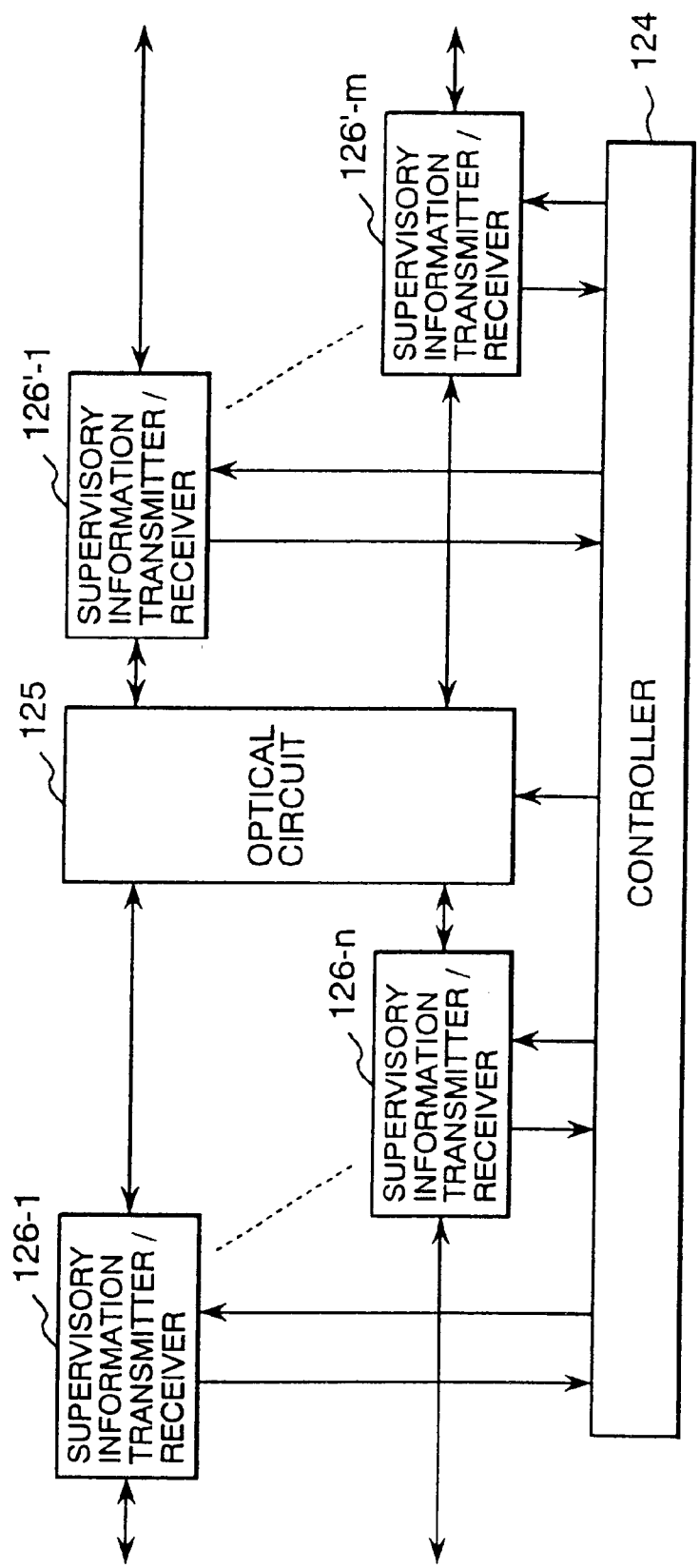
FIG. 19 is a drawing for explaining further other embodiment of the optical cross-connect in accordance with the present invention.

Other embodiments of the cross-connect equipment of the present invention will be explained by referring to FIGS. 19 through 21. FIG. 19 is for explaining the other example of the bi-directional optical cross-connect equipment which is constructed with the optical repeater of the embodiment of the present invention. In FIG. 19, supervisory information transmitter/receiver 126-1-126-$n$, 126-1'-126-$n$' pick up or extract the wavelength of the supervisory optical signals from the optical signal inputted from the optical fibers by the de-multiplexing of the wavelength, and they insert the supervisory optical signals into the optical signals to be outputted to the optical fibers by the multiplexing of the wavelength.

FIGS. 20A and 20B show the constructions of the supervisory information transmitter/receiver 126 and 126'. The signal from the optical fiber passes through a wavelength multi/de-multiplexer 127 and is divided by the supervisory optical signal therefrom through the optical repeater 121. The supervisory optical signal is converted into the supervisory electric signal to be sent to the controller 124. On the contrary to this, the signal from the optical switch passes through the wavelength multi/de-multiplexer 127 and multiplexes the supervisory optical signal, which is obtained by the conversion of the supervisory electric signal from the controller 124 in the optical repeater 122, so as to send it out to the optical fiber. Further, as shown in FIGS. 20C and 20D, the construction omitting the wavelength multi/de-multiplexer 127 thereof is also possible. In that case, as are apparent from those FIGS. 20C and 20D, it does not matter if the order or sequence of the optical repeaters 121-1', 122-1' and 121-2', 122-2' is reversed upside-down.

The wavelengths Os and Os' of the light sources included in the optical repeaters 122 can be selected in the 1.3 πm band or in the 1.5 πm band (for example, 1.51 πm) where showing low loss in the transmission line, outside of the band-width of the Erbium doped fiber, or within the band-width of the Erbium doped fiber as well. Further, it can be selected at the wavelength 1.48 πm being same to that of the pumping light source.

Within the supervisory optical signal sent from the upper stream, there is included the control signal of the optical circuit 125, therefore, by this control signal, it is possible to control the optical switch, the optical amplifier, the regenerator, etc., included in the optical circuit. In the same manner, it is also possible to include the control signal for the cross-connect equipment into the supervisory optical signal to be sent out to the downstream side thereof.

It is apparent that the example of the optical circuit which is applicable to the optical cross-connect equipment shown in FIG. 19 can be any one of those optical circuits which are shown in FIGS. 14 through 16, from the reversibility of light. One example of this is shown in FIG. 21 of an optical circuit, in which the uni-directional optical circuit shown in FIG. 18 is used as one for the bi-directions.

In FIG. 21, the optical circuit 125-3-2 is constructed by combining the optical circuit 125-1, the optical circuit 125-2 (-1 or -2), and the optical circuit 125-1'. With this construction, the change-over by an unit of the WDM signal is performed by the optical circuit 125-1 with respect to the input of the WDM signal, then, the change-over by an unit of the individual wavelength is performed by the optical circuit 125-2-1 or 125-2-2 for sending out thereof.

With the optical circuit 125-3-2, it is possible to realize the functions of the optical circuit 125-1, the optical circuit 125-2 and the optical circuit 125-1', at the same time. Namely, the restoration from the obstruction or trouble, i.e., the cut down of the optical fibers or the optical cables, as well as the setting of transmission lines by an unit of the wavelength can be realized.

The operation of the optical circuit 125-3-2 is controllable by the controller shown in FIG. 19. The optical switch used in each optical circuit also can be of a blocking type or non-blocking type. Further, it does not matter even if the number of the inputs and the number of the outputs of the optical circuit are same to or different to each other.

Although the reference numeral 125-3-2 is attached to the optical circuit for the purpose of explanation thereof, however the optical circuit 125-3-2 is basically same to the optical circuit 125-3-1 shown in FIG. 18. On the contrary, this means that also the optical circuits shown in FIGS. 14 through 16 can be used in the optical circuits for the bi-directions.

Figure 22:
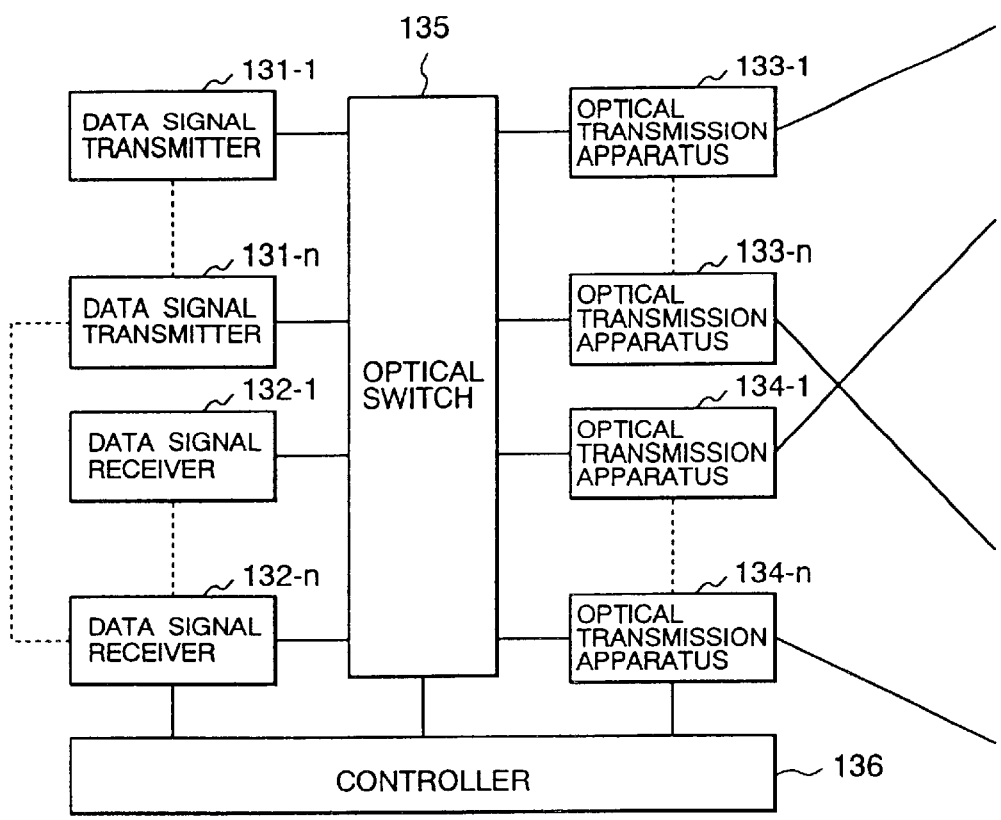
FIG. 22 is a drawing for explaining further other example of the optical cross-connect equipment in accordance with the present invention.

FIG. 22 shows the further other example of the optical cross-connect equipment constructed by using the optical transmission apparatuses of the embodiments of the present invention which are explained heretofore. In FIG. 22, reference numerals 131-1-131-$n$ denote data signal transmitters, 132-1-132-$n$ data signal receivers, 133-1-133-$n$ and 134-1-134-$n$ the optical transmission apparatuses, 135 the optical switch, and 136 the controller.

The example of the optical cross-connect equipment shown in FIG. 22 is such that the optical transmission apparatuses of the respective embodiments of the present invention mentioned above and the data signal transmitter and the data signal receiver are built-in, and it is constructed with: the optical switch 135 having the similar function as explained in FIG. 12; the plurality of data signal transmitters 131-1-131-$n$; the data signal receivers 132-1-132-$n$; the plurality of the optical transmission apparatus 133-1-133-$n$, 134-1-134-$n$; and the controller 136 for controlling all of those. The plurality of optical transmission apparatuses 133-1-133-$n$ which are connected to the output terminals of the optical switch 135 are used as those for transmitting the data optical signals and the supervisory optical signals, and one of those explained in FIGS. 1–4 and FIG. 8 can be used for them. Further, the plurality of optical transmission apparatuses 134-1-134-$n$ which are connected to the output terminals of the optical switch 135 are used as those for receiving the data optical signals and the supervisory optical signals, and as those can be used the optical repeaters explained in FIGS. 9 and 10, but deleting the optical transmission apparatus 91 thereof. Further, as is previously mentioned, it is possible to connect the data signal transmitters 131-1-131-$n$ and the data signal receivers 132-1-132-$n$, directly, so as to use them as the repeater. In FIG. 22, an example of the direct connection of the data signal transmitter 131-*n* and the data signal receiver 132-*n* is shown by a broken line. Further, the optical transmission apparatuses 133-1-133-*n* can be replaced by the optical transmission apparatuses 122-1'-122-*n*' shown in FIG. 13, and in the same manner, the optical transmission apparatuses 134-1-134-*n* can also be replaced by the optical transmission apparatuses 121-1'-121-*n*' shown in FIG. 13.

Furthermore, the data signal transmitter and the data signal receiver can be different in the transmission bit rate, respectively. The controller 136 is able to control the output power level and the gain of the optical transmission apparatus depending on the transmission bit rate.

With the optical cross-connect equipment being so constructed as mentioned in the above, the optical switches, the large number of the optical transmission apparatuses, the data signal transmitter and the data signal receiver can be controlled by the only one of the controller. Since only one light source can be shared or used in common, as the pumping light source and as the supervisory light source which are necessary for the optical transmission apparatus, and further this light source also can be used in common with the large number of the optical transmission apparatuses, therefore, it is possible to construct the apparatus cheaply and with small size.

Further, though the data optical signal is also explained as a signal of a single wavelength in the construction shown in FIG. 22, however it can be the signal of the wavelength multiplexed.

The optical cross-connect equipment shown in FIGS. 12, 13, 19 and 22 are preferably used for constructing the node equipment of the optical network, which can be constructed by connecting the plurality of node equipment through the optical fibers to one anther. Further, various concrete constructions have been already known for such the node equipment which can be used in the optical cross-connect equipment.

Figure 23:
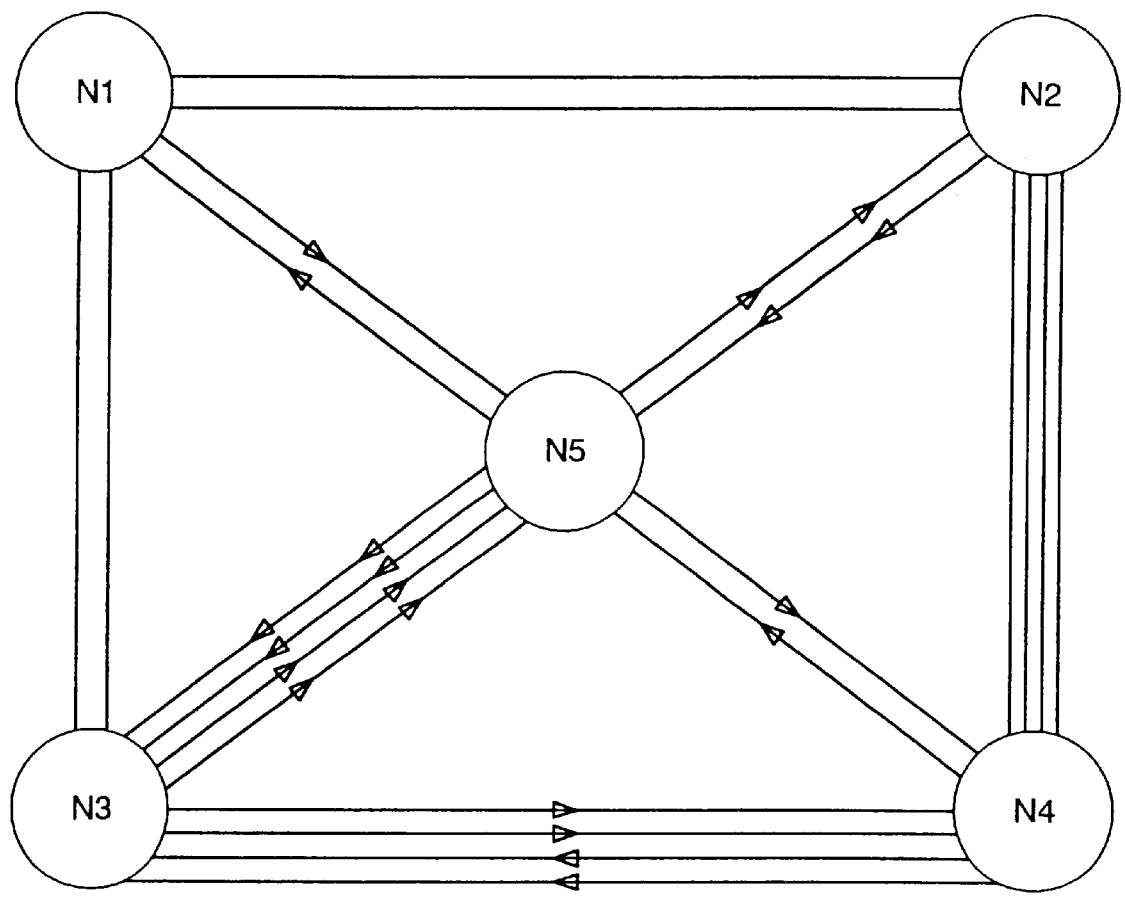
FIG. 23 is a drawing of showing an example of the optical network constructed with the node equipment which are constructed by using the optical cross-connect equipment in accordance with the present invention.

FIG. 23 shows an example of an optical network which is constructed with the optical repeaters and the node equipment which are constructed with the optical cross-connect equipment constructed by using the optical repeaters. In this FIG. 23, reference numerals N1–N-5 denote the node equipment. The optical network shown in FIG. 23 is constructed by connecting the plurality of node equipment N1–N-5 one another through the plurality of optical fibers in a net-like manner, each of which transmits the signals in bi-directions. In general, the transmission of the signal through the optical fiber can be achieved at a distance of about 70 km, without provision of the relay amplifier on the way thereof, however the relay amplifier is necessary if the distance between the node equipment becomes further than that. In the example shown in FIG. 23, the relay amplifiers indicated by a mark ※ are provided on the way of the optical fibers, appropriately.

Each of the node equipment N1–N5 provided within the network is constructed with the optical cross-connect equipment explained in either one of FIGS. 12, 13, 19 and 22. Further, as the light relay amplifiers which are provided on the way of the optical fibers of the transmission line, one of the optical transmission apparatuses which are explained in FIGS. 1–4 and 8–10 can be used, or, also can be used the optical repeaters explained in FIGS. 9 and 10, but deleting the optical transmission apparatus therefrom. As the light relay amplifiers provided on the way of the optical fibers can be used also a light relay amplifier which is described in U.S. Pat. No. 5,500,756. Further, as the light relay amplifier, the optical transmission apparatus explained in FIG. 6 can be used, by making the optical fibers one by one as a set, by which the signal is transmitted in opposing directions.

The network mentioned in the above can be constructed cheaply, by using the optical transmission apparatuses of the respective embodiments in accordance with the present invention, and the optical repeaters including the optical transmission apparatuses and the optical cross-connect equipment using those optical repeaters, as a whole thereof.

Further, in the same manner as mentioned in the explanations of FIGS. 1 through 13 and 22, the data optical signal can be the signal of a single wavelength also in the construction shown in FIG. 23, or it can be the signal of the wavelength multiplexed.

As is fully explained in the above, in accordance with the present invention, the single light source for pumping and supervisory information can be used in common, i.e., as the light source for pumping up the doped fibers in the optical transmission apparatus, as well as the light source for the supervisory information, thereby, enabling a simple construction of the optical repeater including the optical transmission apparatuses. Further, in accordance with the present invention, in case that the plurality of the optical transmission apparatuses are used, or in case that the plurality of doped fibers are provided within a single optical transmission apparatus, it is also possible to obtain an effect that the plurality of doped fibers can be pumped up only by providing the single light source which is provided for the pumping and supervisory information, furthermore that the light source also can be used for the supervisory information.

By constructing the optical cross-connect equipment with the optical transmission apparatus(es) in accordance with the present invention, the optical switches and the large number of the optical transmission apparatuses, which are included in the inside of the optical cross-connect equipment, can be controlled by the single controller, and the single light source can be share or used in common, as the pumping light source and as the supervisory light source and it further can be used in common with the large number of the optical transmission apparatuses, therefore, the apparatus can be constructed small in size and with cheap.

Further, constructing by using the optical transmission apparatuses in accordance with the present invention and the node equipment comprising the optical cross-connect equipment which uses the optical transmission apparatuses in accordance with the present invention, the optical network can be constructed cheaply as a whole.

As the relevant art relating to the optical repeater, there has been already known a technology described in U.S. Pat. No. 5,550,756, therefore, the disclosure of which is hereby incorporated by reference. Further, as the relevant art relating to the optical cross-connect equipment, there has been already known a technology described in Japanese Patent Application Nos. Hei 9-33779 (1997) and Hei 9-39238 (1997) which will be issued in U.S. as U.S. Patent(s) corresponding thereto in near future, therefore, the disclosures of which are hereby incorporated by reference.

What is claimed is:

1. An optical cross-connect equipment comprising:
   (1) an optical switch having a plural number of input ports and a plural number of output ports, for exchanging connections between said input ports and said output ports;
   (2) a first transmission apparatus, having:
      a first wavelength demultiplexer for dividing an input optical signal applied thereto into a supervisory optical signal and a wavelength multiplexed input signal;

a supervisory optical signal receiver for receiving said supervisory optical signal, to extract an input supervisory information therefrom; and a second wavelength demultiplexer for dividing said wavelength multiplexed input signal into optical signals, each having a separate wavelength, thereby to connect the optical signals to the different input ports of said optical switch, respectively;

(3) a second transmission apparatus, having;

a first wavelength multiplexer for wavelength multiplexing the optical signals from the plural number of output ports of said optical switch, to form a multiplexed waveform output;

a supervisory optical signal transmitter for converting an output supervisory information into the supervisory optical signal; and a second wavelength multiplexer for multiplexing said wavelength multiplexed output signals and said supervisory optical signal, thereby to provide an output optical signal of the second transmission apparatus; and (4) a controller for inputting the input supervisory information obtained in said first transmission apparatus and for outputting the output supervisory information to said second transmission apparatus.

2. An optical cross-connect equipment, as defined in the claim 1, wherein said first transmission apparatus further includes an optical amplifier for amplifying said wavelength multiplexed input signal, disposed in a front stage of said second wavelength demultiplexer.

3. An optical cross-connect equipment, as defined in the claim 2, wherein at least one of said first transmission apparatus and said second transmission apparatus are provided in a plural number thereof.

4. An optical cross-connect equipment, as defined in the claim 1, wherein said second transmission apparatus further includes an optical amplifier for amplifying said wavelength multiplexed output signal, disposed in a rear stage of said second wavelength multiplexer.

5. An optical cross-connect equipment, as defined in the claim 4, wherein at least one of said first transmission apparatus and said second transmission apparatus are provided in a plural number thereof.

6. An optical cross-connect equipment, as defined in the claim 1, wherein, said first transmission apparatus further includes an optical amplifier for amplifying said wavelength multiplexed input signal, disposed in a front stage of said second wavelength demultiplexer; and said second transmission apparatus further includes an optical amplifier for amplifying said wavelength multiplexed output signal, disposed in a rear stage of said second wavelength multiplexer.

7. An optical cross-connect equipment, as defined in the claim 6, wherein at least one of said first transmission apparatus and said second transmission apparatus are provided in a plural number thereof.

8. An optical cross-connect equipment, as defined in the claim 1, wherein said first transmission apparatus further includes an interface portion for receiving the optical signals, each having the separate wavelength and converting said optical signals into electrical signals and converting said electrical signals into optical signals, said interface portion disposed in a rear stage of said second wavelength demultiplexer.

9. An optical cross-connect equipment, as defined in the claim 8, wherein at least one of said first transmission apparatus and said second transmission apparatus are provided in a plural number thereof.

10. An optical cross-connect equipment, as defined in the claim 1, wherein said second transmission apparatus further includes an interface portion for receiving the optical signals, converting said optical signals into the electrical signals and converting said electrical signals into the optical signals, each having the separate wavelength, said interface portion disposed in a front stage of said first wavelength multiplexer.

11. An optical cross-connect equipment, as defined in the claim 10, wherein at least one of said first transmission apparatus and said second transmission apparatus are provided in a plural number thereof.

12. An optical cross-connect equipment, as defined in the claim 1, wherein, said first transmission apparatus further includes an interface portion for receiving the optical signals, each having the separate wavelength and converting said optical signals into electrical signals and converting said electrical signals into optical signals, said interface portion disposed in a rear stage of said second wavelength demultiplexer; and said second transmission apparatus further includes an interface portion for receiving the optical signals, converting said optical signals into the electrical signals and converting said electrical signals into the optical signals, each having the separate wavelength, said interface portion disposed in a front stage of said first wavelength multiplexer.

13. An optical cross-connect equipment, as defined in the claim 12, wherein at least one of said first transmission apparatus and said second transmission apparatus are provided in a plural number thereof.

14. An optical cross-connect equipment, as defined in the claim 1, wherein wavelength of said supervisory optical signal is selected from any one of 1.3 um band, 1.5 um band, and 1.48 um band.

15. An optical cross-connect equipment, as defined in the claim 14, wherein at least one of said first transmission apparatus and said second transmission apparatus are provided in a plural number thereof.

16. An optical cross-connect equipment, as defined in the claim 1, wherein the information transmitted by said supervisory optical signals includes at least any one of a network supervisory information, a wavelength multiplex system supervisory information, and an optical switch supervisory information.

17. An optical cross-connect equipment, as defined in the claim 16, wherein at least one of said first transmission apparatus and said second transmission apparatus are provided in a plural number thereof.

18. An optical cross-connect equipment, as defined in the claim 1, wherein said controller conducts supervision on said optical switch.

19. An optical cross-connect equipment, as defined in the claim 18, wherein at least one of said first transmission apparatus and said second transmission apparatus are provided in a plural number thereof.

20. An optical cross-connect equipment, as defined in the claim 1, wherein at least one of said first transmission apparatus and said second transmission apparatus are provided in a plural number thereof.

* * * * *